United States Patent
Ramirez, Jr. et al.

[15] 3,702,003
[45] Oct. 31, 1972

[54] ALGORITHM TO MINIMIZE ITERATIVE COMPUTATION IN A PROCESS FOR THE ANALYSIS OR DESIGN OF A PHYSICAL SYSTEM

[72] Inventors: W. Fred Ramirez, Jr., Boulder; Charles R. Vestal, Denver, both of Colo.

[73] Assignee: Marathon Oil Company, Findlay, Ohio

[22] Filed: Oct. 9, 1970

[21] Appl. No.: 79,579

[52] U.S. Cl. ............ 444/1, 235/151.12, 235/151.31
[51] Int. Cl. .......................... G06f 15/32, G06f 15/46
[58] Field of Search ........ 235/150, 150.1, 151, 151.1, 235/180, 151.12, 151.31; 444/1

[56] References Cited

FOREIGN PATENTS OR APPLICATIONS

| | | |
|---|---|---|
| 1,039,141 | 8/1966 | Great Britain ............. 235/150 |
| 1,039,142 | 8/1966 | Great Britain ............. 235/150 |

OTHER PUBLICATIONS

Lee and Rudd, " On The Ordering of Recycle Calculations" ; Aiche Journal, November 1966, pp. 1184–1190

Primary Examiner—Joseph F. Ruggiero
Attorney—Joseph C. Herring, Richard C. Willson, Jr. and Jack L. Hummel

[57] ABSTRACT

A process is described for the solution of a system of algebraic equations. A general purpose computer is programmed to perform the steps of the process. These steps include (1) forming a consolidated matrix descriptive of the entire system of equations and variables, (2) identifying design (specified) variables and/or iterative variables by a unique elimination procedure so as to minimize the number of iterative variables and to minimize the number of relations which must be solved simultaneously (i.e. minimize nested iterative calculations), (3) using a calculation procedure to determine the computational sequence for solution of the equations, and (4) solving these equations in the order determined by the computational sequence and determining the numerical values of the system variables.

This process reduces computer computation time and identifies those essential variables which must be specified (design variables) in order to obtain a solution. Any physical system which is described by an under-specified or adequately specified set of equations can be solved by this process. One application involves designing a chemical processing plant by solving an under-specified set of equations descriptive of the units, streams, etc. of the plant.

9 Claims, 7 Drawing Figures

*Elimination procedure to determine design and iterative variables.*

Elimination procedure to determine design and iterative variables.

Procedure for determining computational sequence.

VARIABLE NUMBER

| Eq. | 2 | 3 | 4 | 6 | 8 | 9 | 11 | 12 | 13 | 14 | 15 | 16 | 17 | 18 | 19 | 20 | 21 | 22 | 23 | 24 | 26 | 27 | 28 | 29 | 30 | 31 | 32 | 33 | 34 |
|---|---|---|---|---|---|---|---|---|---|---|---|---|---|---|---|---|---|---|---|---|---|---|---|---|---|---|---|---|---|
| 1 | 1 |   |   | 1 |   |   |   |   |   |   |   |   |   |   |   |   |   |   |   |   |   |   |   |   |   |   |   |   |   |
| 2 |   | 1 |   |   | 1 |   |   |   |   |   |   |   |   |   |   |   |   |   |   |   |   |   |   |   |   |   |   |   |   |
| 3 |   |   |   |   |   |   |   | 1 |   |   |   |   |   |   |   |   |   |   |   |   |   |   |   |   |   |   |   |   |   |
| 4 |   |   | 1 |   |   |   | 1 | 1 |   | 1 |   |   |   |   |   |   |   |   |   |   |   |   |   |   |   |   |   |   |   |
| 5 |   |   |   |   |   |   |   |   |   | 1 | 1 | 1 |   |   |   |   |   |   |   |   |   |   |   |   |   |   |   |   |   |
| 6 | 1 |   |   |   |   |   |   |   |   |   | 1 |   | 1 |   |   |   |   |   |   |   |   |   |   |   |   |   |   |   |   |
| 7 |   |   |   |   |   |   |   |   |   | 1 | 1 | 1 |   |   |   |   |   | 1 | 1 | 1 |   |   |   |   |   |   |   |   |   |
| 8 |   |   |   |   |   |   |   |   |   |   |   | 1 |   |   |   |   |   |   |   |   |   |   |   |   |   | 1 | 1 |   |   |
| 9 | 1 | 1 |   |   |   |   |   |   |   |   |   |   |   |   |   |   |   |   |   |   |   |   |   |   |   |   |   |   |   |
| 10 |   |   |   |   |   |   |   |   |   |   |   | 1 |   | 1 |   |   |   |   |   |   |   |   |   |   |   |   |   |   |   |
| 11 |   |   |   |   |   |   |   |   |   |   |   |   | 1 |   | 1 |   |   |   |   |   |   |   |   |   |   |   |   |   |   |
| 12 |   |   |   |   |   |   |   |   |   |   |   | 1 |   | 1 |   |   |   |   | 1 |   |   |   |   |   |   |   |   |   |   |
| 13 |   |   |   |   |   |   |   |   |   |   | 1 |   | 1 |   |   |   |   | 1 |   | 1 |   |   |   |   |   |   |   |   |   |
| 14 |   |   |   |   |   |   |   |   |   |   |   |   |   |   |   |   |   | 1 | 1 | 1 |   |   |   | 1 |   |   |   |   |   |
| 15 |   |   |   |   |   |   |   |   |   |   |   |   |   |   |   |   |   |   |   |   |   | 1 | 1 | 1 |   |   |   |   |   |
| 16 |   |   |   |   |   |   |   |   |   |   |   |   |   |   |   | 1 | 1 | 1 |   |   |   |   |   |   |   |   |   |   |   |
| 17 |   | 1 | 1 |   |   |   |   |   |   |   |   |   |   |   |   | 1 |   | 1 |   |   |   |   |   |   |   |   |   |   |   |
| 18 |   |   |   |   |   | 1 | 1 |   |   |   |   |   |   |   |   | 1 |   | 1 |   |   |   |   |   |   |   |   |   |   |   |
| 19 |   |   |   |   |   |   |   |   | 1 |   |   |   |   |   |   |   | 1 | 1 |   |   |   |   |   |   |   |   |   |   |   |
| 20 |   |   |   |   |   |   |   |   |   |   |   |   |   |   |   | 1 | 1 | 1 |   |   |   |   | 1 | 1 |   |   |   |   |   |
| 21 |   |   |   |   |   |   |   |   |   |   |   |   |   | 1 |   |   |   |   |   |   |   |   |   |   |   |   | 1 | 1 |   |

*Fig. 3a*

| | VARIABLE No. | | | | | | | | | | | | | |
|---|---|---|---|---|---|---|---|---|---|---|---|---|---|---|
| EQUATION No. | 1 | 2 | 3 | 4 | 5 | 6 | 7 | 8 | 9 | 10 | 11 | 12 | 13 | 14 |
| 1 | 1 | | | 1 | 1 | | 1 | 1 | 1 | | | | | 1 |
| 2 | | 1 | | | 1 | 1 | 1 | 1 | 1 | | | | | |
| 3 | | | 1 | 1 | | 1 | 1 | 1 | 1 | | | | | |
| 4 | | | | | | | 1 | | | | | | 1 | |

*Fig. 4a*

ALGORITHM TO MINIMIZE ITERATIVE COMPUTATION IN A PROCESS FOR THE ANALYSIS OR DESIGN OF A PHYSICAL SYSTEM

CROSS REFERENCES TO RELATED APPLICATIONS

No related U. S. Patent applications are known to the inventors.

BACKGROUND OF THE INVENTION

1. Field of the Invention

The present invention relates to the field of computational equipment, computational processes and computer programs particularly useful for the sequencing of the solution of individual equations within a set of simultaneous equations so as to minimize computational time. Some or all of the equations may be non-linear in character. The system of equations is further characterized by the fact that it is either adequately specified or under-specified, with the number of variables appearing in the system greater than or equal to the number of equations, i.e., the degrees of freedom of the system is greater than, or equal to, zero. To solve an under-specified system, certain design variables must be specified to reduce the degrees of freedom of the system to zero.

2. Description of the Prior Art

In chemical process design, a process flow diagram must be initially defined. The design engineer is then faced with the task of determining a computational strategy in order to perform process and equipment calculations. In the past, this strategy has been determined from experience and engineering intuition. The work of Rudd, (see "The Synthesis of Systems Designs: 1, Elementary Decomposition Theory," AICHE Journal, Vol. 14, No. 2, pp 343, March 1968) is one of the earliest attempts to place this decision on some mathematical basis. The process of the present invention is an extension and improvement of Rudd's work and is based on the objective of minimizing the number of relations which must be solved simultaneously. For non-linear algebraic equations this affords a minimization of iterative computation.

Lee and Rudd, "On the Ordering of Recycle Calculations," AICHE Journal, Vol. 12, No. 6, pp 1184, November 1966, teach a method of determining whether design and/or iterative variables are present in a system of equations. However, they do not provide insight for distinguishing iterative from design variables. In contrast, the present invention identifies those variables which must be design variables and furthermore provides insight into choosing iterative variables. The invention specifies which choices are available in choosing iterative variables.

In describing a plant process, design variables can be either input, (e.g., raw material flow rate) output, (e.g., product purity) or equipment variables, (e.g., operating temperature). It is the purpose of the present invention to choose a set of design variables in such a way so as to minimize the amount of iterative computation necessary. Based on this set of design variables, the computational sequence (which equation to use to solve for a particular variable and in what order) is specified. Unlike the prior art, the present process can handle systems which require iterative computation in the computational sequence. Further the present process can handle either explicit or implicit iteration in solving for the iterative variables.

SUMMARY

General Statement of the Invention

Given a set of algebraic equations, some or all of which may be non-linear, containing more variables (unknowns) than equations, and descriptive of some physical system, the process of the present invention selects which of the variables should be specified in order to minimize the iterative calculation necessary to obtain a solution. The present invention also involves equipment, processes, and computer programs for selecting the order in which individual equations within a set of simultaneous algebraic equations are to be solved so as to minimize the total time and total calculational effort necessary to the solution of the entire set of equations.

Utility of the Invention

Calculational machines, particularly general purpose digital computers, and the processes and computer programs taught herein, are useful in the solving of sets of underspecified simultaneous algebraic equations so as to minimize the expense and effort involved. Such sets of equations are often encountered in daily commercial and scientific operations, e.g., in cost analysis, chemical engineering plant design, electronic circuit design, distribution analysis, etc. The cost of solution of such equations is very substantial and methods for reducing the computer time involved and thus the cost therefor, are highly desirable and have widespread utility.

BRIEF DESCRIPTION OF THE DRAWINGS

FIG. 3a is a diagram depicting the system structural matrix for Example V which will be solved according to the present invention.

FIG. 4a is a block diagram depicting the system structural matrix for Example VII which will be solved according to the present invention.

Figure 2:
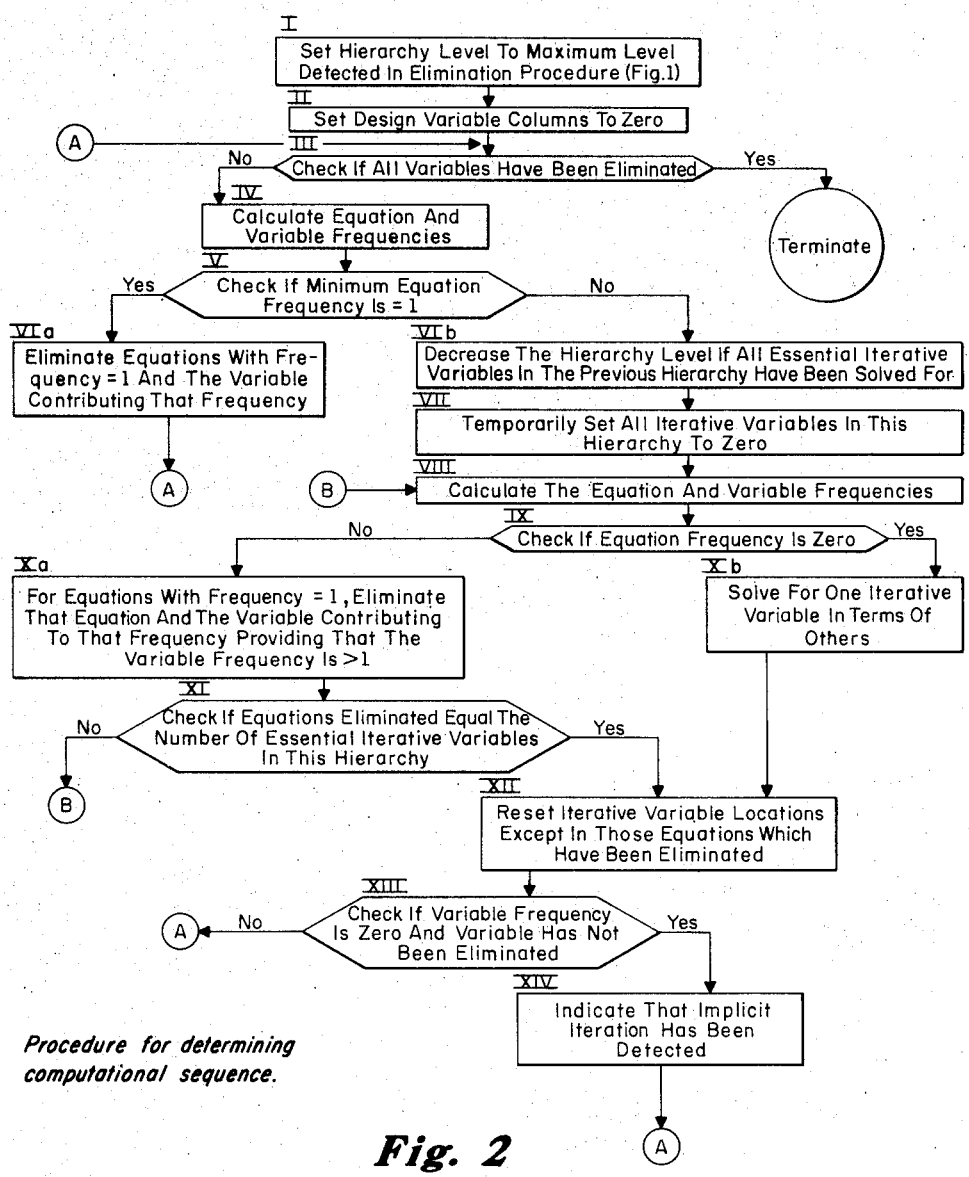
FIG. 2 is a block diagram depicting the procedure for determining the computational sequence in solving these sets of equations according to the present invention.

Two actual programs written in Algol computer language are included in appendix A to this specification. The first of these is entitled "Elimination" and implements the preferred embodiment shown in FIG. 1. The second program is entitled "Calculational Sequence"

and implements the preferred embodiment shown in FIG. 2. These programs are illustrative rather than limitative of the invention.

DESCRIPTION OF THE PREFERRED EMBODIMENTS

1. The following terms are defined to facilitate the reading and understanding of the specification and claims of the present invention.

By "iterative calculation" is meant a method of successively approximating the solution to an equation using a recursion formula until the equation is satisfied within a prescribed degree of accuracy.

By "matrix" is meant a rectangular array of numbers, or other elements, useful as a computational device.

By "structural matrix" is meant a matrix which designates which variables are known in each equation of a set of equations and which variables are unknown in each such equation. The structural matrix is formed by letting each row represent an equation and each column represent a single variable. At each intersection of a row and column a designator is inserted to show whether that variable is known or unknown in that equation. For example, a "1" may be used to indicate that that variable is unknown in that equation and a "0" to indicate that that variable is known in that equation. Obviously, rows and columns may be interchanged so that variables are designated by rows and equations designated by columns.

By "known variable" is meant that, in the equation in question and at the point in the calculation in question, the variable has a determined numerical value or that the variable does not appear in the equation.

By "unknown variable" is meant that, in the equation in question and at the point in the calculation in question, the variable does not have a determined numerical value and the variable does appear in the equation.

By "consolidating" matrices is meant combining a plurality of matrices to form a single matrix by adding the rows of one matrix onto a base matrix and providing additional columns as necessary to provide one column for each variable contained in the combined matrix.

By "system structural matrix" is meant the matrix formed by consolidating all of the structural matrices which describe a given system.

By "design variable" is meant an initially unknown variable which is given a numerical value at an intermediate point in the computational process and thus becomes a known variable. In any set of equations the number of design variables will be equal to the number of degrees of freedom of the system structural matrix.

By "iterative variable" is meant an unknown variable, the numerical value of which will be assumed so that its true numerical value can be iteratively calculated.

By "frequency of occurrence" of a variable, or "variable frequency" is meant the number of equations which contain that variable as an unknown.

By "computational sequence" is meant the order in which the numerical values of unknown variables is determined and the sequence also indicates in which equation the numerical value of each variable is to be determined.

By "hierarchy level" is meant the occurrence of a minimum variable frequency greater than one. The detection of such a hierarchy level indicates the presence of one or more iterative variables. The first hierarchy level detected is designated a value of "1," and each succeeding hierarchy level value is incremented by one.

By "nested iterative calculations" is meant iterative calculation which must be performed within other iterative calculation(s).

By "redesignating" is meant changing the value of an unknown variable designator to indicate that the variable is known, e.g., redesignating "1" (unknown) to "0" (known).

By "explicit" is meant solving an equation for an unknown variable directly in terms of other known variables.

By "implicit" is meant solving for an unknown variable by means of a defining relation which is not itself solved for the unknown variable.

2. Basic Process Steps

The invention utilizes either a special purpose computing machine (computer) or a general purpose computer programmed to perform, in sequence, the following steps as applied to a set of algebraic equations, some or all of which can be non-linear, which contain more variables than equations:

a. One or more structural matrices is formed in which each row is an equation of the system and in which each column is a variable of the system, or vice versa, and wherein each variable is designated as being either known or unknown;

b. The structural matrices are then consolidated, as necessary, to form a single system structural matrix descriptive of the entire system;

c. Design and/or iterative variables are identified by algebraic operations on the system structural matrix so as to minimize the number of iterative variables, and identifying iterative variable hierarchy level(s) so as to minimize nested iterative calculations;

d. Once the design and/or iterative variables are identified, the computational sequence is specified for solving the system of equations by algebraic manipulation of the system structural matrix;

e. The equations are then solved in the order selected by the computational sequence, thereby determining values for the system variables.

3. Identifying Design and/or Iterative Variables by an Elimination Procedure

Figure 1:
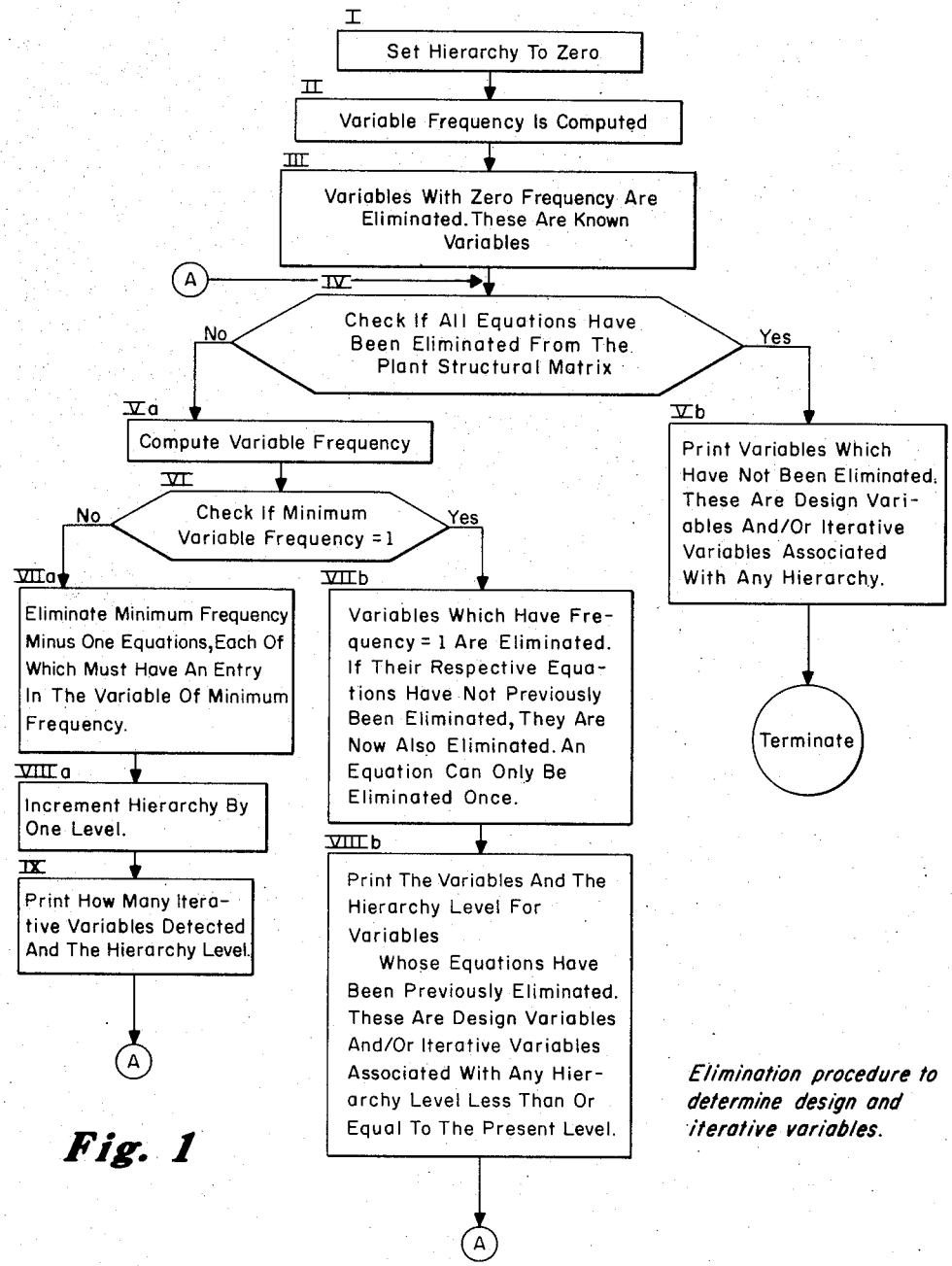
FIG. 1 is a block diagram depicting the elimination procedure for determining the design and iterative variables according to the present invention.

The algebraic operations defining the procedure are depicted in FIG. 1, and reference should be made to this drawing in the following description of the procedure. The parenthetical references below refer to the blocks of that figure.

The purpose of the elimination procedure is to determine which variables must be specified (design variables) in order to minimize the number of iterative variables needed to solve the set of algebraic equations. It is also the purpose of the elimination procedure to identify different levels of iterative calculations (hierarchy levels) which can be used in the following procedure to determine the calculational sequence so as to minimize the number of nested iterative calculations.

Initially, the hierarchy level is set to zero (I) and the frequency of occurrence of each variable of the plant structural matrix is computed (II). Since some of the variables of the system structural matrix may be known variables, these variables will occur with zero frequency and these variables are eliminated (III). The effect is to reduce the number of columns in the matrix.

A check is made to see if all of the equations have been eliminated from the plant structural matrix (IV). If this is the case, the entire algebraic operations of the algorithm are completed and variables which have not been eliminated in the procedure are design and/or iterative variables associated with any hierarchy level (Vb). The equations should then be solved according to the procedure for determining the computational sequence (see VI, 4 herein). If all the equations haven't been eliminated, the variable frequency is again computed, and the algorithm continues (Va).

Those variables which appear in the plant structural matrix with a frequency of one (VI) can be solved for directly and are therefore designated as known and eliminated from the matrix with their respective equations, i.e., the column (variable) is made zero and the respective row (equation) is also made zero (VIIb). The algorithm proceeds by systematically searching for and eliminating variables of frequency one.

If the minimum variable frequency is greater than one (VI), this implies that iteration is necessary and that a hierarchy level has been detected. The number of iterative variables to be detected (and hence the number of equations to be eliminated) necessary to continue the solution is the minimum variable frequency minus one (VIIa). For instance, if the minimum variable frequency is three, three minus one, or two equations having an entry in the variable of minimum frequency must be eliminated. Once the minimum frequency minus one iterative variables have been detected, within any given hierarchy level, the hierarchy level is incremented by one (VIIIa). As FIG. 1 indicates, the algorithm proceeds by going back to check to see if all the equations have been eliminated from the plant structural matrix, and the process is repeated (i.e., go to "A" in FIG. 1).

The detection of iterative and/or design variables is as follows. Variables whose equations are subsequently eliminated (so that the variable frequency becomes zero) are denoted as either design or iterative variables. The relative order of appearance of these variables with the detection of iterative loops (hierarchy level) is important, for it tells whether they are essential to a particular iterative loop. A variable can only be associated with a hierarchy level lower than or equal to the one in which it was detected. Those variables associated with the zero hierarchy level are design variables only, and thus are immediately specified.

If in any given hierarchy level, more than the minimum frequency minus one design or iterative variables are detected, the engineer chooses which of these variables should be specified (design variables) with the remaining variables (minimum frequency minus one in number) denoted as essential iterative variables associated with that particular hierarchy level. In some instances, no design or iterative variables will be found within a given hierarchy level. The iterative variable(s) associated with that hierarchy level is then detected within a subsequent hierarchy level. This situation represents a "nested" loop—a loop within another loop. The present algorithm and invention tends to minimize the number of these loops within loops and thus minimizes the number of nested iterative calculations required during the computational sequence procedure (discussed below under VI, 4).

As the design and recycle variables are detected, they may be printed or otherwise identified (IXa, VIIIb). The number of degrees of freedom of the system will be equal to the number of design variables which must be specified.

4. Procedure for the Determining Computational Sequence

An information flow diagram for the computational sequence procedure is given in FIG. 2 of the drawings, and the parenthetical references below are to the blocks of that figure.

The computational sequence procedure is essentially a preferred method of sequencing and solving the equations of the structural matrix utilizing the design and iterative variables found in the elimination procedure and the order in which the iterative variables were detected. The computational sequence preferably proceeds in the reverse order of hierarchy as determined in the elimination procedure, i.e., setting hierarchy equal to the maximum, then reducing it in steps of one (I).

The computational sequence starts by assuming knowledge of the design variables (II). This information is implemented by replacing all ones by zeroes in the system structural matrix, for instance. The next step is to calculate the equation and variable frequencies (IV). Those equations which have a frequency equal to one can be solved uniquely for the unknown variable (V). These equations with frequency one are eliminated along with the variable contributing to that frequency (VIa). The algorithm continues in this fashion as long as possible, eliminating from the system structural matrix the equations of frequency one and their associated variables.

When the minimum equation frequency is greater than one (V), iterative information is required and the iterative variables in the present hierarchy are temporarily assumed (i.e. set to zero) in order to continue the computational procedure (VII). The hierarchy level is decreased by one when all essential iterative variables in the previous hierarchy have been solved for (VIb).

After the iterative variables of the present hierarchy level are set to zero, the equation and variable frequencies are then recalculated (VIII). A check is then made to see if the equation frequency is zero (IX). If not, the equations of frequency one (and which contain at least one of the iterative variables assumed in the present hierarchy) are eliminated (redesignated as known) and the variable contributing to that frequency is also eliminated, provided that the variable frequency is greater than one (Xa). If the equation frequency checked is zero, one iterative variable is solved in terms of the other(s) (Xb).

Next, a check is made to see if the number of equations eliminated (redesignated as known) is equal to the number of essential iterative variables in the hierarchy level under consideration (X). If this is not the case, the equation and variable frequencies are again recalculated and the algorithm systematically continues (i.e., go to "B" in FIG. 2). When the number of equations eliminated equals the number of essential iterative variables in the particular hierarchy, the iterative variables in equations which have not been eliminated are redesignated as unknown (XII). If all the system variables have been redesignated as known, the calculational sequence is the order in which the system variables in the corresponding equations have been redesignated as known. If unknown variables still remain (III), the algorithm is continued by recomputing the frequency of occurrence of each variable and by computing the number of unknown variables remaining in each equation and proceeding with a check to see if the minimum equation frequency is one. This procedure is continued until all the system variables have been redesignated as known. If during this process, the frequency of occurrence of an iterative variable goes to zero without the iterative variable having been redesignated as known, then an implicit iterative loop has been found (III).

Detection of an iterative loop for each hierarchy level defined a set of equations containing the iterative variable(s) under consideration and which must be solved simultaneously by iterative techniques. What essentially takes place is that in one equation the iterative variable is assumed to be known and designated a value. The iterative loop is then traced through to other equation(s) until the iterative variable is again encountered. At this point, the iterative variable is redesignated as unknown and that equation is solved explicitly for the iterative variable. If the value obtained is equal to or within a prescribed incremental tolerance of the assumed value originally given the iterative variable the computational sequence procedes by descending to the next hierarchy level. If the calculated value of the iterative variable is not within the incremental tolerance of the assumed value, iteration continues until convergence to the answer. A preferred convergence technique is taught in Wegstein, J.H., "Accelerating Convergence of Iterative Processes," Comm. ACM, Vol. 1, No. 6, pg 9 (1958), although any iterative and convergence technique may be employed and be within the scope of the invention. An implicit iterative loop is essentially the same, except that the tolerance check for closure of the loop is made on a variable other than the iterative variable.

As the equations are solved by the particular computational sequence provided herein, the values for the system variables are determined.

EXAMPLES

The following examples are submitted to illustrate certain preferred embodiments of the invention and to demonstrate how the algorithm is applied to particular problems, although the invention is not meant to be limited by such illustrations in any manner.

Examples I–IV are shown to illustrate the specific details contained within each of the algorithms. These examples have been constructed solely for this purpose; however, the equations and variables contained within these examples could be made to represent physical processes. Examples V–VII, however, are physical processes. The algorithms will be applied to these examples and the final results of the algorithm rather than the individual details of each algorithm will be reported.

EXAMPLE I (Simplified Example of the Invention)

Given a system described by the following set of algebraic equations, $f_1(x_1, x_3) = 0$
$f_2(x_1) = 0$
$f_3(x_2, x_3) = 0$ the algebraic operations defining the elimination procedure to be used to identify the design and/or iterative variables are depicted in FIG. 1. Reference should be made to this figure in order to better understand the following description. Parenthetical references refer to the blocks of FIG. 1.

From the set of three equations and three unknown variables, form the system structural matrix. For convenience, a "1" will designate an unknown variable in an equation and a "0" will designate a known variable. Each equation will form one row of the system structural matrix and each variable will form one column. The system structural matrix is shown below:

|       | $x_1$ | $x_2$ | $x_3$ |
|-------|-------|-------|-------|
| $f_1$ | 1     | 0     | 1     |
| $f_2$ | 1     | 0     | 0     |
| $f_3$ | 0     | 1     | 1     |

Following FIG. 1, a general purpose digital computer is programmed to perform the following sequential operations:

I. Set hierarchy level to zero.
II. Calculate variable frequency of occurrence.

|                    | $x_1$ | $x_2$ | $x_3$ |
|--------------------|-------|-------|-------|
| Variable Frequency | 2     | 1     | 2     |

III. No variables appear with zero frequency; therefore, none are originally known.
IV. All equations have not been eliminated from the system structural matrix; therefore, continue.
VI. Test whether the minimum variable frequency equals "1."
VIIb. Variables which have frequency equal to "1" are eliminated. If their respective equations have not previously been eliminated, they are now also eliminated. An equation can only be eliminated once. Therefore, in our example problem, variable $x_2$ and equation $f_3$ will be eliminated. The resulting structural matrix is shown below. For convenience, the elimination process will be presented in the structural matrix by redesignating as known the variable and equation which are eliminated. Here, the variable and equation which are eliminated will also be enclosed in brackets to further indicate the fact that they have been eliminated. In actual computer operation, this elimination is accomplished by setting a true-false (Boolean) variable equal to true when elimination is properly to be done.

|         | $x_1$ | $[x_2]$ | $x_3$ |
|---------|-------|---------|-------|
| $f_1$   | 1     | 0       | 1     |
| $f_2$   | 1     | 0       | 0     |
| $[f_3]$ | 0     | 0       | 0     |

IV. Test whether all of the equations have been eliminated. This is easily accomplished by seeing if any equations are not bracketed. Since two equations still remain, the algebraic operations will proceed.

(Va.) Compute the variable frequency.

| | $x_1$ | $x_2$ | $x_3$ |
|---|---|---|---|
| Variable Frequency | 2 | 0 | 1 |

VI. Test whether the minimum variable frequency is equal to "1." Variable $x_3$ has a frequency of "1" occurring in equation $f_1$.

VIIb. Variables which have frequency equal to "1" are eliminated. If their respective equations have not previously been eliminated, they are now also eliminated. Any equation can only be eliminated once. The resulting system structural matrix after this operation would appear as shown below:

| | $x_1$ | $[x_2]$ | $[x_3]$ |
|---|---|---|---|
| $[f_1]$ | 0 | 0 | 0 |
| $f_2$ | 1 | 0 | 0 |
| $[f_3]$ | 0 | 0 | 0 |

It can be seen from this plant structural matrix that variable $x_3$ was eliminated along with equation $f_1$.

IV. Test whether all of the equations have been eliminated.

Va. Since one equation remains, the variable frequency is once again computed.

| | $x_1$ | $x_2$ | $x_3$ |
|---|---|---|---|
| Variable Frequency | 1 | 0 | 0 |

VI. Test whether the minimum variable frequency is equal to "1." Variable $x_1$ has a frequency of "1" occurring in equation $f_2$.

VIIb. Variables which have frequency equal to "1" are eliminated along with their respective equation, if it has not previously been eliminated.

| | $[x_1]$ | $[x_2]$ | $[x_3]$ |
|---|---|---|---|
| $[f_1]$ | 0 | 0 | 0 |
| $[f_2]$ | 0 | 0 | 0 |
| $[f_3]$ | 0 | 0 | 0 |

IV. Test whether all of the equations have been eliminated from the system structural matrix.

Vb. Since all of the equations have been eliminated, variables which have not been eliminated are now printed. These are the design and/or iterative variables associated with the hierarchy level as detected. For this example problem, there are no design or iterative variables and the hierarchy level remains at "0."

At this point, the purpose of the elimination procedure has been fulfilled; that is, the variables which must be specified (design variables) in order to reduce the degrees of freedom of the system of equations to zero have been determined. Additionally, the different levels of iterative calculations (hierarchy levels) have also been determined. For this simplified example problem, there are no design variables since the initial degrees of freedom of the system was zero and, further, there are no iterative variables detected and the hierarchy level remains at "0."

The process of this invention now continues by determining the computational sequence. FIG. 2 of the drawings depicts the information flow diagram for the computational sequence. Parenthetical references below are to blocks of FIG. 2 and reference should be made to these blocks to better understand the description that follows. The algebraic manipulations to be followed in determining the computational sequence are based on results obtained in determining the design and/or iterative variables following the algebraic operations depicted on FIG. 1. Both algebraic procedures are similar in that each start from the original system structural matrix.

| | $x_1$ | $x_2$ | $x_3$ |
|---|---|---|---|
| $f_1$ | 1 | 0 | 1 |
| $f_2$ | 1 | 0 | 0 |
| $f_3$ | 0 | 1 | 1 |

Following FIG. 2 a general purpose digital computer is programmed to perform the following sequential operations:

I. Set hierarchy level to the maximum level detected in the elimination procedure (FIG. 1); in this case this will be set to "0." This again means that there will be no iterative variables associated with this problem.

II. Set design variable columns to "0." In this example problem there are no design variables, so no columns will be changed.

III. Test whether all variables have been eliminated from the system structural matrix. All variables have not been eliminated; therefore, continue.

IV. Calculate equation and variable frequencies.

| | $f_1$ | $f_2$ | $f_3$ |
|---|---|---|---|
| Equation Frequency | 2 | 1 | 2 |

| | $x_1$ | $x_2$ | $x_3$ |
|---|---|---|---|
| Variable Frequency | 2 | 1 | 2 |

V. Test whether the minimum equation frequency is equal to "1."

VIa. Equations which have frequency equal to "1" and the variable which contributes that frequency are now eliminated. In this example problem, equation $f_2$ and variable $x_1$ will be eliminated. As before, the elimination procedure will be depicted here by bracketing the equation and variable and by redesignating as known that equation and variable in the system structural matrix.

| | $[x_1]$ | $x_2$ | $x_3$ |
|---|---|---|---|
| $f_1$ | 0 | 0 | 1 |
| $[f_2]$ | 0 | 0 | 0 |
| $f_3$ | 0 | 1 | 1 |

III. Continue the procedure by checking to see if all variables have been eliminated. Since only one of the original three variables has been eliminated, we continue.

IV. Calculate equation and variable frequencies.

| | $f_1$ | $f_2$ | $f_3$ |
|---|---|---|---|
| Equation Frequency | 1 | 0 | 2 |

| | $x_1$ | $x_2$ | $x_3$ |
|---|---|---|---|
| Variable Frequency | 0 | 1 | 2 |

V. Test whether the minimum equation frequency is equal to "1." The frequency of occurrence of unknown variables in equation $f_1$ is now equal to "1" since the information about whether or not it is known or unknown for variables $x_1$ has been calculated in the previous step using equation $f_2$.

VI$a$. We will therefore eliminate equations with frequency equal to "1" and the variable contributing that frequency.

|        | $[x_1]$ | $x_2$ | $[x_3]$ |
|--------|---------|-------|---------|
| $[f_1]$ | 0       | 0     | 0       |
| $[f_2]$ | 0       | 0     | 0       |
| $f_3$   | 0       | 1     | 0       |

III. Continue by checking to see if all variables have been eliminated. Since one variable remains, continue.

IV. Calculate equation and variable frequencies.

| Equation Frequency | $f_1$ | $f_2$ | $f_3$ |
|---|---|---|---|
|   | 0 | 0 | 1 |

| Variable Frequency | $x_1$ | $x_2$ | $x_3$ |
|---|---|---|---|
|   | 0 | 1 | 0 |

V. Test whether the minimum equation frequency is equal to "1." The frequency of occurrence of unknown variables in equation $f_3$ is now equal to "1" because the knowledge of the value for variable $x_3$ has been determined from equation $f_1$ in the previous step.

VI$a$. Eliminate equations with frequency equal to one and the variable contributing that frequency.

|        | $[x_1]$ | $[x_2]$ | $[x_3]$ |
|--------|---------|---------|---------|
| $[f_1]$ | 0       | 0       | 0       |
| $[f_2]$ | 0       | 0       | 0       |
| $[f_3]$ | 0       | 0       | 0       |

III. Test whether all variables have been eliminated. Since this is now the case, the algorithm terminates.

The calculational sequence has just been determined for this example problem. Variable $x_1$ would be solved using equation $f_2$ in the first step. The second step would utilize this value of $x_1$ in equation $f_1$ to solve for the unknown variable $x_3$. In the third step the calculated value of the variable $x_3$ would be used in equation $f_3$ to solve for variable $x_2$. At this point, all three unknown variables have been solved for.

The calculational sequence may further be conveniently shown in the following table:

| Sequence No. | Equation | Variable | Hierarchy Level |
|---|---|---|---|
| 1 | $f_2$ | $x_1$ | 0 |
| 2 | $f_1$ | $x_3$ | 0 |
| 3 | $f_3$ | $x_2$ | 0 |

In executing this algorithm, the variable frequencies were calculated at each step but were not used. Variable frequencies will only be used in the case of iterative calculations.

EXAMPLE II (Example of the Invention)

Given a system described by the following set of algebraic equations, $f_1(x_1, x_3, x_4) = 0$
$f_2(x_1) = 0$
$f_3(x_2, x_3) = 0$ the algebraic operations depicted in FIG. 1 which define the elimination procedure will be referenced in a manner similar to that followed in Example I.

Form the system structural matrix from the set of three equations and four unknown variables. As in Example I, a "1" will designate an unknown variable in an equation and a "0" will designate a known variable. Each equation will form one row of the system structural matrix and each variable will form one column. The system structural matrix is shown below:

|       | $x_1$ | $x_2$ | $x_3$ | $x_4$ |
|-------|-------|-------|-------|-------|
| $f_1$ | 1     | 0     | 1     | 1     |
| $f_2$ | 1     | 0     | 0     | 0     |
| $f_3$ | 0     | 1     | 1     | 0     |

Following FIG. 1, a general purpose digital computer is programmed to perform the following sequential operations:

I. Set hierarchy level to zero.

II. Calculate variable frequency of occurrence.

| Variable Frequency | $x_1$ | $x_2$ | $x_3$ | $x_4$ |
|---|---|---|---|---|
|   | 2 | 1 | 2 | 1 |

III. No variables appear with an initial frequency of "0"; therefore, none are originally known.

IV. All of the equations have not been eliminated from the system structural matrix; therefore, continue.

VI. Test whether the minimum variable frequency equals "1."

VII$b$ Variables which have frequency equal to "1" are eliminated. If their respective equations have not previously been eliminated, they are now also eliminated. An equation can only be eliminated once. During this elimination procedure, the process will be represented in the system structural matrix by redesignating as known the variable and equation which are eliminated (i.e., insert all "0"s). The variable and equation which are eliminated will further be enclosed in braces to indicate the fact that they have been eliminated. In our example problem, variable $x_2$ and equation $f_3$ and variable $x_4$ and equation $f_1$ will be eliminated.

|        | $x_1$ | $[x_2]$ | $x_3$ | $[x_4]$ |
|--------|-------|---------|-------|---------|
| $[f_1]$ | 0     | 0       | 0     | 0       |
| $f_2$   | 1     | 0       | 0     | 0       |
| $[f_3]$ | 0     | 0       | 0     | 0       |

VI. Test whether all of the equations have been eliminated. This is easily accomplished by seeing if any equations are not bracketed. Since equation $f_2$ still remains, the algebraic operations proceed.

V$a$. Compute the variable frequency.

| Variable Frequency | $x_1$ | $x_2$ | $x_3$ | $x_4$ |
|---|---|---|---|---|
|   | 1 | 0 | 0 | 0 |

VI. Test whether the minimum variable frequency is equal to "1."

VIIb. Variables which have frequency equal to "1" are eliminated. If the respective equation has not previously been eliminated, it is now also eliminated. An equation can only be eliminated once. In this example problem, variable $x_1$ and equation $f_2$ meet these criteria. The resulting system structural matrix after this elimination would appear as shown below.

|       | $[x_1]$ | $[x_2]$ | $x_3$ | $[x_4]$ |
|-------|---------|---------|-------|---------|
| $[f_1]$ | 0 | 0 | 0 | 0 |
| $[f_2]$ | 0 | 0 | 0 | 0 |
| $[f_3]$ | 0 | 0 | 0 | 0 |

VI. Test whether all of the equations have been eliminated.

Vb. Since all of the equations have been eliminated, variables which have not been eliminated are now designated as design and/or iterative variables associated with the hierarchy level as detected. For this example problem, the variable $x_3$ has not been eliminated. Therefore, it is either a design or an iterative variable. However, the hierarchy level has not been incremented and remains at "0"; therefore, variable $x_3$ *must* be a design variable associated with this problem. The results of the elimination procedure may be conveniently represented in the following table.

| Hierarchy Number | Variables Not Eliminated | Interpretation |
|---|---|---|
| 0 | $x_3$ | Design Variable |

The elimination procedure has just terminated by determining which variable must be specified (design variable) in order to reduce the degrees of freedom of the system of equations to "0." Additionally, the elimination procedure has detected that iterative calculations will not be required for the solution of this problem. For this example problem, there is one design variable, no iterative variables, and the hierarchy level remains at "0."

A computational sequence must now be determined using the process of FIG. 2. This process will also use the results obtained in determining the design and/or iterative variables following the algebraic operations in FIG. 1. Starting from the original system structural matrix,

|       | $x_1$ | $x_2$ | $x_3$ | $x_4$ |
|-------|-------|-------|-------|-------|
| $f_1$ | 1 | 0 | 1 | 1 |
| $f_2$ | 1 | 0 | 0 | 0 |
| $f_3$ | 0 | 1 | 1 | 0 | following the steps of FIG. 2, a general purpose digital computer is programmed to perform the following sequential operations:

I. Set the hierarchy level to the maximum level detected in the elimination procedure (FIG. 1) which, in this case, will be set to "0." This again means that there will be no iterative variables associated with this problem.

II. Set the design variable columns to "0." For this example problem, all of the entries in the column variable $x_3$ will be set to "0." The resulting structural matrix is shown below:

|       | $x_1$ | $x_2$ | $[x_3]$ | $x_4$ |
|-------|-------|-------|---------|-------|
| $f_1$ | 1 | 0 | 0 | 1 |
| $f_2$ | 1 | 0 | 0 | 0 |
| $f_3$ | 0 | 1 | 0 | 0 |

Design variables will be further indicated by enclosing them in brackets so that we will know they have been eliminated from the system structural matrix.

III. Test whether all of the variables have been eliminated from the system structural matrix. Since only one variable has been eliminated, the algorithm will continue.

IV. Calculate equation and variable frequencies.

Equation Frequency: $f_1$ 2  $f_2$ 1  $f_3$ 1

Variable Frequency: $x_1$ 2  $x_2$ 1  $x_3$ 0  $x_4$ 1

V. Test whether the minimum equation frequency is equal to "1."

VIa. Equations which have frequency equal to "1" and the variable which contributes that frequency are now eliminated. In this example problem, equation $f_2$ and variable $x_1$, and equation $f_3$ and variable $x_2$ will be eliminated. As before, the elimination procedure will be indicated by bracketing the equation and variable and by redesignating as known that equation and variable in the system structural matrix.

|       | $[x_1]$ | $[x_2]$ | $[x_3]$ | $x_4$ |
|-------|---------|---------|---------|-------|
| $f_1$ | 0 | 0 | 0 | 1 |
| $[f_2]$ | 0 | 0 | 0 | 0 |
| $[f_3]$ | 0 | 0 | 0 | 0 |

III. Test whether all of the variables have been eliminated. Since variable $x_4$ remains, the algorithm continues.

IV. Calculate equation and variable frequencies.

Equation Frequency: $f_1$ 1  $f_2$ 0  $f_3$ 0

Variable Frequency: $x_1$ 0  $x_2$ 0  $x_3$ 0  $x_4$ 1

V. Test whether the minimum equation frequency is equal to "1." The frequency of occurrence of unknown variables in equation $f_1$ is now equal to "1." Information about whether or not variable $x_1$ is known has just been calculated in the previous step using equation $f_2$.

VIa. Eliminate equations with frequencies equal to "1" and the variable contributing to that frequency. In this example problem, variable $x_4$ will be eliminated along with equation $f_2$.

|       | $[x_1]$ | $[x_2]$ | $[x_3]$ | $[x_4]$ |
|-------|---------|---------|---------|---------|
| $[f_1]$ | 0 | 0 | 0 | 0 |
| $[f_2]$ | 0 | 0 | 0 | 0 |
| $[f_3]$ | 0 | 0 | 0 | 0 |

III. Test whether all variables have been eliminated. Since all of the variables have now been eliminated, the algorithm terminates.

The calculational sequence has just been determined for this example problem. Variable $x_1$ would be solved for using equation $f_2$ in the first step. In the second step, variable $x_2$ would be solved for using equation $f_3$. In the third step, variable $x_4$ would be solved for using equation $f_1$ and using the knowledge of the value of $x_1$ which was determined in the original step. The following table may be used to conveniently show the calculational sequence.

| Sequence No. | Equation | Variable | Hierarchy Level |
|---|---|---|---|
| 1 | $f_2$ | $x_1$ | 0 |
| 2 | $f_3$ | $x_2$ | 0 |
| 3 | $f_1$ | $x_4$ | 0 |

In determining this calculational sequence, variable frequencies were calculated but were not used. Variable frequencies will be used only in the case of iterative calculations.

It should be noted that in executing the procedure to determine the calculational sequence, we have conveniently eliminated equations with frequency of "1" in a left to right order. The algorithm will work equally as well if equations are eliminated from right to left or in a random sequence.

EXAMPLE III (Example of the Invention)

Given a system described by the following set of algebraic equations $f_1(x_1, x_3) = 0$
$f_2(x_1, x_2) = 0$
$f_3(x_2, x_3) = 0$ the algebraic operations depicted in FIG. 1 will be used to determine the design and/or iterative variables for this system.

The system structural matrix representative of this system is shown below:

|  | $x_1$ | $x_2$ | $x_3$ |
|---|---|---|---|
| $f_1$ | 1 | 0 | 1 |
| $f_2$ | 1 | 1 | 0 |
| $f_3$ | 0 | 1 | 1 |

Following FIG. 1, a general purpose digital computer is programmed to perform the following sequential operations:

I. Set hierarchy level to "0."
II. Calculate variable frequency of occurrence.

| Variable Frequency | $x_1$ | $x_2$ | $x_3$ |
|---|---|---|---|
|  | 2 | 2 | 2 |

III. Test whether any variables initially appear with "0" frequency. In our example problem, no variables appear with a frequency equal to "0"; therefore, none are originally known.
IV. Test whether all equations have been eliminated from the plant structural matrix. Since no equations have been eliminated, we continue the process.
VI. Test whether the minimum variable frequency is equal to "1."
VIa. In this example problem, no variable appears with a frequency equal to "1." Therefore, we must eliminate minimum frequency minus one equations, each of these equations having an entry in the variable of minimum frequency column. In our example problem, the minimum frequency is equal to "2"; therefore, 2−1 or 1 equation must be eliminated. Taking variable $x_1$, we can see that equation $f_1$ has an entry in the column of minimum frequency. We will, therefore, eliminate equation $f_1$. This elimination is shown in the system structural matrix shown below.

|  | $x_1$ | $x_2$ | $x_3$ |
|---|---|---|---|
| $[f_1]$ | 0 | 0 | 0 |
| $f_2$ | 1 | 1 | 0 |
| $f_3$ | 0 | 1 | 1 |

It should be noted in this example problem that either equation $f_2$ or equation $f_3$ could also have been eliminated since they have entries in columns which have the minimum frequency of occurrence. However, for convenience, the algorithm proceeds through the system structural matrix from top to bottom and from left to right.

VIIIa. Increment the hierarchy by one level. The hierarchy level is now equal to "1."
IX. At this point denote that one iterative variable (number of iterative variables is equal to the minimum frequency minus 1 equations) has been detected, and the hierarchy level is equal to "1."
IV. Test whether all equations have been eliminated from the plant structural matrix. Since two equations have not been eliminated, we continue the process.
V$a$. Compute the variable frequency.

| Variable Frequency | $x_1$ | $x_2$ | $x_3$ |
|---|---|---|---|
|  | 1 | 2 | 1 |

VI. Test whether the minimum variable frequency is equal to "1."
VII$b$. Variables which have frequency equal to "1" are eliminated. If their respective equations have not previously been eliminated, they are now also eliminated. An equation can only be eliminated once. The resulting system structural matrix, after this operation, would appear as shown below.

|  | $[x_1]$ | $x_2$ | $[x_3]$ |
|---|---|---|---|
| $[f_1]$ | 0 | 0 | 0 |
| $[f_2]$ | 0 | 1 | 0 |
| $[f_3]$ | 0 | 0 | 0 |

This system structural matrix shows the results of eliminating variable $x_1$ and equation $f_2$, and variable $x_3$ and equation $f_3$.

IV. Test whether all equations have been eliminated from the plant structural matrix.
V$b$. All of the equations have now been eliminated, print the variables which have not been eliminated. These are design variables and/or iterative variables associated with any hierarchy level detected in the problem. For this example problem, there are no design variables (degrees of freedom equal zero), and one iterative variable has been detected along with a hierarchy level equal to "1." Further, the iterative variable is variable $x_2$ since it was not eliminated from the plant structural matrix. Results of this elimination procedure shown in the following table.

| Hierarchy Number | Variables Not Eliminated | Interpretation |
|---|---|---|
| 0 | None | — |
| 1 | $x_2$ | Iterative Variable |

We continue now by determining the computational sequence. Following FIG. 2, a general purpose digital computer is programmed to perform the following sequential operations starting from the original system structural matrix.

|     | $x_1$ | $x_2$ | $x_3$ |
|---|---|---|---|
| $f_1$ | 1 | 0 | 1 |
| $f_2$ | 1 | 1 | 0 |
| $f_3$ | 0 | 1 | 1 |

I. Set hierarchy level to the maximum level detected in the elimination procedure (FIG. 1). For this example problem, this will be set to "1." This means that there will be one iterative level associated with this problem. Since the iterative level is equal to "1," there will be no possibility of nested iterations; that is, iterations within other iterations.

II. Set design variable columns to "0." For this example problem, there are no design variable, so no columns will be changed.

III. Test whether all variables have been eliminated from the system structural matrix. Since we have not eliminated any variables, we will continue.

IV. Calculate equation and variable frequencies:

| Equation Frequency | $f_1$ | $f_2$ | $f_3$ |
|---|---|---|---|
|  | 2 | 2 | 2 |

| Variable Frequency | $x_1$ | $x_2$ | $x_3$ |
|---|---|---|---|
|  | 2 | 2 | 2 |

V. Test whether the minimum equation frequency is equal to "1." Since the minimum frequency is equal to 2, we must continue the algorithm.

VI$b$. Decrease the hierarchy level if all essential iterative variables in the previous hierarchy level have been solved for. Since this is not the case, we again continue.

VII. Temporarily set all iterative variables in this hierarchy to "0." For this example problem, this involves temporarily assuming that the value of variable $x_2$ is known. This, again, is conveniently shown in the following system structural matrix. A temporarily assumed variable will be indicated by enclosing the variable in parentheses rather than in brackets which have been used to show that the variable has been eliminated.

|     | $x_1$ | $(x_2)$ | $x_3$ |
|---|---|---|---|
| $f_1$ | 1 | 0 | 1 |
| $f_2$ | 1 | 0 | 0 |
| $f_3$ | 0 | 0 | 1 |

VIII. Calculate the equation and variable frequencies.

| Equation Frequency | $f_1$ | $f_2$ | $f_3$ |
|---|---|---|---|
|  | 2 | 1 | 1 |

| Variable Frequency | $x_1$ | $x_2$ | $x_3$ |
|---|---|---|---|
|  | 2 | 0 | 2 |

IX. Test whether any equation frequencies have been reduced to "0." Since none have been reduced to "0" continue.

X$a$. For equations with frequency equal to "1," eliminate that equation and the variable contributing to that frequency providing that the variable frequency is greater than "1." For this example problem, the equation frequency of equation $f_2$ is equal to "1" and the variable contributing to that frequency, variable $x_1$, has a variable frequency equal to "2." Therefore, this is a valid elimination step.

|       | $[x_1]$ | $(x_2)$ | $x_3$ |
|---|---|---|---|
| $f_1$   | 0 | 0 | 1 |
| $[f_2]$ | 0 | 0 | 0 |
| $f_3$   | 0 | 0 | 1 |

XI. Test whether the number of equations eliminated equal the number of essential iterative variables in this hierarchy. Since this is the case for this example problem, continue.

XII. Reset iterative variable locations except in those equations which have been eliminated. The system structural matrix now appears as:

|       | $[x_1]$ | $x_2$ | $x_3$ |
|---|---|---|---|
| $f_1$   | 0 | 0 | 1 |
| $[f_2]$ | 0 | 0 | 0 |
| $f_3$   | 0 | 1 | 1 |

XIII. Test whether any variable frequency has been reduced to "0" and the variable has not been eliminated. Since this is not the case, continue.

III. Test whether all variables have been eliminated. Since two variables remain, proceed.

IV. Calculate equation and variable frequencies.

| Equation Frequency | $f_1$ | $f_2$ | $f_3$ |
|---|---|---|---|
|  | 1 | 0 | 2 |

| Variable Frequency | $x_1$ | $x_2$ | $x_3$ |
|---|---|---|---|
|  | 0 | 1 | 2 |

V. Test whether the minimum equation frequency is equal to "1."

VI. Eliminate equations with frequency equal to "1" and the variable contributing that frequency. In this case, equation $f_1$ together with variable $x_3$ will be eliminated.

|         | $[x_1]$ | $x_2$ | $[x_3]$ |
|---|---|---|---|
| $[f_1]$   | 0 | 0 | 0 |
| $[f_2]$   | 0 | 0 | 0 |
| $f_3$     | 0 | 1 | 0 |

III. Test whether all variables have been eliminated. Variable $x_2$ has not been eliminated; therefore, continue.

IV. Calculate equation and variable frequencies.

| Equation Frequency | $f_1$ | $f_2$ | $f_3$ |
|---|---|---|---|
|  | 0 | 0 | 1 |

| Variable Frequency | $x_1$ | $x_2$ | $x_3$ |
|---|---|---|---|
|  | 0 | 1 | 0 |

V. Test whether the minimum equation frequency is equal to "1." Variable $x_2$ appears in equation $f_3$ and the minimum equation frequency is equal to "1."

VIa. Eliminate equations with frequency equal to "1" and the variable contributing to that frequency.

|       | $[x_1]$ | $[x_2]$ | $[x_3]$ |
|-------|---------|---------|---------|
| $[f_1]$ | 0 | 0 | 0 |
| $[f_2]$ | 0 | 0 | 0 |
| $[f_3]$ | 0 | 0 | 0 |

III. Test whether all variables have been eliminated. Since this is now the case, the algorithm has terminated.

The calculational sequence for this example problem involving an iterative variable has just been determined. The computational sequence would proceed by assuming the value of the variable $x_2$ and using this value in equation $f_2$ to calculate the value of the variable $x_1$. In the second step, the value of variable $x_1$ would be used in equation $f_1$ to solve for the unknown variable $x_3$. In the third step, the value just calculated for the variable $x_3$ would be used in equation $f_3$ to calculate a value of variable $x_2$. The computational sequence as described will continue until the value of the variable $x_2$ which is calculated from equation $f_3$ in the third step would be within some prescribed tolerance of the value of variable $x_2$ which was assumed initially to be used in the first step of the calculational procedure in equation $f_2$ to calculate variable $x_1$. It should be further noted that the type of iteration which has been detected here is explicit; that is a value for the variable $x_2$ will be assumed and the resulting value of variable $x_2$ will be calculated directly.

In the case of iterative calculations, the representation of the calculational sequence in a table is very convenient. The table depicting the calculational sequence for this problem is shown below.

| Sequence No. | Equation | Variable | Hierarchy Level |
|--------------|----------|----------|-----------------|
|   | Assume Variable | $x_2$ | 1 |
| 1 | $f_2$ | $x_1$ | 1 |
| 2 | $f_1$ | $x_3$ | 1 |
| 3 | $f_3$ | $x_2$ | 1 |
|   | Loop to Sequence 1 |  |  |

EXAMPLE IV (Example of the Invention)

Given a system described by the following set of algebraic equations, $f_1(x_1, x_2) = 0$
$f_2(x_1, x_2, x_3) = 0$
$f_3(x_2, x_3, x_4) = 0$
$f_4(x_3, x_4, x_5) = 0$
$f_5(x_4, x_5) = 0$ The algebraic operations depicted in FIG. 1 will be followed to determine the design and/or iterative variables for this example problem. The system structural matrix for this problem is shown below.

|       | $x_1$ | $x_2$ | $x_3$ | $x_4$ | $x_5$ |
|-------|-------|-------|-------|-------|-------|
| $f_1$ | 1 | 1 | 0 | 0 | 0 |
| $f_2$ | 1 | 1 | 1 | 0 | 0 |
| $f_3$ | 0 | 1 | 1 | 1 | 0 |
| $f_4$ | 0 | 0 | 1 | 1 | 1 |
| $f_5$ | 0 | 0 | 0 | 1 | 1 |

Following the process of FIG. 1, a general purpose digital computer is programmed to perform the following sequential operations:

I. Set hierarchy level to "0."
II. Calculate variable frequency of occurrence.

| Variable Frequency | $x_1$ | $x_2$ | $x_3$ | $x_4$ | $x_5$ |
|--------------------|-------|-------|-------|-------|-------|
|                    | 2 | 3 | 3 | 3 | 2 |

III. Test whether any variables initially appear with "0" frequency. None are originally known.
IV. No equations have been eliminated from the system structural matrix. Therefore, continue.
VI. Test whether the minimum variable frequency is equal to "1." For this example problem, the minimum variable frequency is not equal to "1"— it is equal to "2" and occurs in both variable $x_1$ and in variable $x_5$.
VIIa. Eliminate the minimum frequency minus one equations, each of which must have an entry in the variable of minimum frequency. Therefore, we could eliminate either equation $f_1$ or $f_2$ since each of these equations have entries in variable $x_1$, or we could eliminate equations $f_4$ or $f_5$ since each of these equations has an entry in variable $x_5$. For convenience, we will eliminate equation $f_1$. The resulting system structural matrix would appear below.

|       | $x_1$ | $x_2$ | $x_3$ | $x_4$ | $x_5$ |
|-------|-------|-------|-------|-------|-------|
| $[f_1]$ | 0 | 0 | 0 | 0 | 0 |
| $f_2$ | 1 | 1 | 1 | 0 | 0 |
| $f_3$ | 0 | 1 | 1 | 1 | 0 |
| $f_4$ | 0 | 0 | 1 | 1 | 1 |
| $f_5$ | 0 | 0 | 0 | 1 | 1 |

VIIIa. The hierarchy level is now incremented by 1. It is now set equal to "1."
IX. The number of iterative variables detected in the hierarchy level will now be denoted. One iterative variable will be listed as being detected since the minimum frequency minus one was equal to one, and the hierarchy level will be printed as being equal to one.
IV. Test whether all equations have been eliminated from the plant structural matrix. Since only one has been eliminated, we continue.
Va. Compute the variable frequency.

| Variable Frequency | $x_1$ | $x_2$ | $x_3$ | $x_4$ | $x_5$ |
|--------------------|-------|-------|-------|-------|-------|
|                    | 1 | 2 | 3 | 3 | 2 |

VI. Test whether the minimum variable frequency is equal to "1."
VIIb. Variables which have frequency equal to "1" are eliminated. If their respective equations have not previously been eliminated, they are now also eliminated. An equation can only be eliminated once. In this example problem, equation $f_2$ and variable $x_1$ will be eliminated. The resulting system structural matrix after this operation would appear as shown below.

|       | $[x_1]$ | $x_2$ | $x_3$ | $x_4$ | $x_5$ |
|-------|---------|-------|-------|-------|-------|
| $[f_1]$ | 0 | 0 | 0 | 0 | 0 |
| $[f_2]$ | 0 | 0 | 0 | 0 | 0 |
| $f_3$ | 0 | 1 | 1 | 1 | 0 |
| $f_4$ | 0 | 0 | 1 | 1 | 0 |
| $f_5$ | 0 | 0 | 0 | 1 | 1 |

IV. Test whether all equations have been eliminated from the plant structural matrix. Since three equations remain, continue.

Va. Compute the variable frequency.

Variable Frequency 
| $x_1$ | $x_2$ | $x_3$ | $x_4$ | $x_5$ |
|---|---|---|---|---|
| 0 | 1 | 2 | 3 | 2 |

VI. Test whether the minimum variable frequency is equal to "1." This is the case for variable $x_2$ in equation $f_3$.

VIIb. Variables which have frequency equal to "1" are eliminated. If their respective equations have not previously been eliminated they are also eliminated. An equation can only be eliminated once. The resulting system structural matrix is shown below.

|  | $[x_1]$ | $[x_2]$ | $x_3$ | $x_4$ | $x_5$ |
|---|---|---|---|---|---|
| $[f_1]$ | 0 | 0 | 0 | 0 | 0 |
| $[f_2]$ | 0 | 0 | 0 | 0 | 0 |
| $[f_3]$ | 0 | 0 | 0 | 0 | 0 |
| $f_4$ | 0 | 0 | 1 | 1 | 1 |
| $f_5$ | 0 | 0 | 0 | 1 | 1 |

IV. Test whether all equations have been eliminated. Since two equations remain, continue.

Va. Compute variable frequency.

Variable Frequency
| $x_1$ | $x_2$ | $x_3$ | $x_4$ | $x_5$ |
|---|---|---|---|---|
| 0 | 0 | 1 | 2 | 2 |

VI. Test whether the minimum variable frequency is equal to "1." Eliminate variables which have frequencies equal to "1" and also eliminate their respective equations if they have not previously been eliminated. An equation can only be eliminated once. The resulting system structural matrix after this operation is shown below.

|  | $[x_1]$ | $[x_2]$ | $[x_3]$ | $x_4$ | $x_5$ |
|---|---|---|---|---|---|
| $[f_1]$ | 0 | 0 | 0 | 0 | 0 |
| $[f_2]$ | 0 | 0 | 0 | 0 | 0 |
| $[f_3]$ | 0 | 0 | 0 | 0 | 0 |
| $[f_4]$ | 0 | 0 | 0 | 0 | 0 |
| $f_5$ | 0 | 0 | 0 | 1 | 1 |

IV. Test whether any equations remain in the system structural matrix. Since equation $f_5$ has not been eliminated, continue.

Va. Compute the variable frequency.

Variable Frequency
| $x_1$ | $x_2$ | $x_3$ | $x_4$ | $x_5$ |
|---|---|---|---|---|
| 0 | 0 | 0 | 1 | 1 |

VI. Test whether the minimum variable frequency is equal to "1."

VIIb. Variables which have frequency equal to "1" are eliminated. Since their respective equations have not previously been eliminated, they are now also eliminated. An equation can only be eliminated once. Therefore, in this operation variable $x_4$ and equation $f_5$ will be eliminated first. When variable $x_5$ is attempted to be eliminated, this cannot happen because the equation has just been eliminated in the previous step. Obviously, we could have taken equation $f_5$ and variable $x_5$ and then not been able to eliminate variable $x_4$; however, for convenience, we have proceeded in an orderly left to right manner through the system structural matrix. The resulting system structural matrix is shown below.

|  | $[x_1]$ | $[x_2]$ | $[x_3]$ | $[x_4]$ | $x_5$ |
|---|---|---|---|---|---|
| $[f_1]$ | 0 | 0 | 0 | 0 | 0 |
| $[f_2]$ | 0 | 0 | 0 | 0 | 0 |
| $[f_3]$ | 0 | 0 | 0 | 0 | 0 |
| $[f_4]$ | 0 | 0 | 0 | 0 | 0 |
| $[f_5]$ | 0 | 0 | 0 | 0 | 0 |

VIIIb. Print the variable and the hierarchy level for those variables with frequency equal to "1" whose equations have been previously eliminated. These are design variables and/or iterative variables associated with any hierarchy level less than or equal to the present level. In this case, we will print that variable $x_5$ is an iterative variable associated with hierarchy level "1."

IV. Test whether all equations have been eliminated from the plant structural matrix. Since all of the equations have now been eliminated, the algorithm will terminate. Results of the elimination process for this example problem are shown in the following table.

| Hierarchy Number | Variables Not Eliminated | Interpretation |
|---|---|---|
| 0 | None | — |
| 1 | $x_5$ | Iterative Variable |

Variable $x_5$, the only variable which was not eliminated, has been shown to be the iterative variable necessary to solve this problem.

The process of this invention will now continue by determining the computational sequence. The algebraic procedure to do this must start from the original system structural matrix.

|  | $x_1$ | $x_2$ | $x_3$ | $x_4$ | $x_5$ |
|---|---|---|---|---|---|
| $f_1$ | 1 | 1 | 0 | 0 | 0 |
| $f_2$ | 1 | 1 | 1 | 0 | 0 |
| $f_3$ | 0 | 1 | 1 | 1 | 0 |
| $f_4$ | 0 | 0 | 1 | 1 | 1 |
| $f_5$ | 0 | 0 | 0 | 1 | 1 |

Following FIG. 2, a general purpose digital computer is programmed to perform the following sequential operations:

I. Set hierarchy level to the maximum level detected in the elimination procedure (FIG. 1). In this case, this will be hierarchy level equal to "1." This means that there will be one iterative level associated with this problem.

II. Set design variable columns to "0." For this example problem, there are no design variables; therefore, no columns will be changed.

III. Test whether all variables have been eliminated from the system structural matrix. Since we have not eliminated any variables, the algorithm will continue.

IV. Calculate the equation and variable frequencies.

Equation Frequency
| $f_1$ | $f_2$ | $f_3$ | $f_4$ | $f_5$ |
|---|---|---|---|---|
| 2 | 3 | 3 | 3 | 2 |

Variable Frequency
| $x_1$ | $x_2$ | $x_3$ | $x_4$ | $x_5$ |
|---|---|---|---|---|
| 2 | 3 | 3 | 3 | 2 |

V. Test whether the minimum equation frequency is equal to "1." The minimum equation frequency in this case is equal to "2," appearing both in equation $f_1$ and in equation $f_5$.

VIb. Decrease the hierarchy level of all essential iterative variables in the previous hierarchy level have been solved for. Since this is not the case, continue.

VII. Temporarily set all iterative variables in this hierarchy to "0." This results in the following system structural matrix. As before, a temporarily assumed variable will be enclosed in parentheses.

|       | $x_1$ | $x_2$ | $x_3$ | $x_4$ | $(x_5)$ |
|-------|-------|-------|-------|-------|---------|
| $f_1$ | 1     | 1     | 0     | 0     | 0       |
| $f_2$ | 1     | 1     | 1     | 0     | 0       |
| $f_3$ | 0     | 1     | 1     | 1     | 0       |
| $f_4$ | 0     | 0     | 1     | 1     | 0       |
| $f_5$ | 0     | 0     | 0     | 1     | 0       |

VIII. Calculate the equation and variable frequencies.

Equation Frequency $\quad \frac{f_1}{2} \quad \frac{f_2}{3} \quad \frac{f_3}{3} \quad \frac{f_4}{2} \quad \frac{f_5}{1}$ Variable Frequency $\quad \frac{x_1}{2} \quad \frac{x_2}{3} \quad \frac{x_3}{3} \quad \frac{x_4}{3} \quad \frac{x_5}{0}$ IX. Test whether the equation frequency is "0." This is not the case; therefore, we will continue.

Xa. For equations with frequency equal to "1," we will eliminate that equation and the variable contributing to that frequency, provided that the variable frequency is greater than "1." In this example problem, the equation frequency of equation $f_5$ is equal to "1," and variable $x_4$, which is the variable that contributes that frequency, has a frequency of occurrence equal to "3." The resulting system structural matrix, after this elimination, is shown below.

|       | $x_1$ | $x_2$ | $x_3$ | $[x_4]$ | $(x_5)$ |
|-------|-------|-------|-------|---------|---------|
| $f_1$ | 1     | 1     | 0     | 0       | 0       |
| $f_2$ | 1     | 1     | 1     | 0       | 0       |
| $f_3$ | 0     | 1     | 1     | 0       | 0       |
| $f_4$ | 0     | 0     | 1     | 0       | 0       |
| $[f_5]$ | 0   | 0     | 0     | 0       | 0       |

XI. Test whether the number of equations eliminated is equal to the number of essential iterative variables in this hierarchy. The number of essential iterative variables is equal to "1," and one equation has been eliminated.

XII. Reset iterative variable locations except in those equations which have been eliminated. The system structural matrix now appears as follows.

|       | $x_1$ | $x_2$ | $x_3$ | $[x_4]$ | $x_5$ |
|-------|-------|-------|-------|---------|-------|
| $f_1$ | 1     | 1     | 0     | 0       | 0     |
| $f_2$ | 1     | 1     | 1     | 0       | 0     |
| $f_3$ | 0     | 1     | 1     | 0       | 0     |
| $f_4$ | 0     | 0     | 1     | 0       | 1     |
| $[f_5]$ | 0   | 0     | 0     | 0       | 0     |

XIII. Test whether any variable frequency is "0" and the variable has not been eliminated. Since this does not occur, continue.

III. Test whether all variables have been eliminated. Since four variables remain, continue.

IV. Calculate equation and variable frequencies.

Equation Frequency $\quad \frac{f_1}{2} \quad \frac{f_2}{3} \quad \frac{f_3}{2} \quad \frac{f_4}{2} \quad \frac{f_5}{0}$ Variable Frequency $\quad \frac{x_1}{2} \quad \frac{x_2}{3} \quad \frac{x_3}{3} \quad \frac{x_4}{0} \quad \frac{x_5}{1}$ V. Test whether the minimum equation frequency is equal to "1." Since the minimum equation frequency is equal to "2," we continue.

VIb. Decrease the hierarchy level if all essential iterative variables in the previous hierarchy have been solved for. This is not the case because $x_5$ has not been solved for; therefore, continue, still working in hierarchy level "1."

VII. Temporarily set all iterative variables in this hierarchy to "0." The resulting system structural matrix is shown below.

|       | $x_1$ | $x_2$ | $x_3$ | $[x_4]$ | $(x_5)$ |
|-------|-------|-------|-------|---------|---------|
| $f_1$ | 1     | 1     | 0     | 0       | 0       |
| $f_2$ | 1     | 1     | 1     | 0       | 0       |
| $f_3$ | 0     | 1     | 1     | 0       | 0       |
| $f_4$ | 0     | 0     | 1     | 0       | 0       |
| $[f_5]$ | 0   | 0     | 0     | 0       | 0       |

VIII. Calculate the equation and variable frequencies.

Equation Frequency $\quad \frac{f_1}{2} \quad \frac{f_2}{3} \quad \frac{f_3}{2} \quad \frac{f_4}{1} \quad \frac{f_5}{0}$ Variable Frequency $\quad \frac{x_1}{2} \quad \frac{x_2}{3} \quad \frac{x_3}{3} \quad \frac{x_4}{0} \quad \frac{x_5}{0}$ IX. Test whether the equation frequency is "0" for any equation which has not been eliminated.

Xa. For equations with frequency equal to "1," eliminate that equation and the variable contributing to that frequency, providing the variable frequency is greater than "1." The equation frequency of equation $f_4$ is equal to "1," and the variable contributing to that frequency is variable $x_3$ which has a frequency of occurrence equal to "3." We will therefore eliminate equation $f_4$ and variable $x_3$. The resulting system structural matrix is shown below.

|       | $x_1$ | $x_2$ | $[x_3]$ | $[x_4]$ | $(x_5)$ |
|-------|-------|-------|---------|---------|---------|
| $f_1$ | 1     | 1     | 0       | 0       | 0       |
| $f_2$ | 1     | 1     | 0       | 0       | 0       |
| $f_3$ | 0     | 1     | 0       | 0       | 0       |
| $[f_4]$ | 0   | 0     | 0       | 0       | 0       |
| $[f_5]$ | 0   | 0     | 0       | 0       | 0       |

XI. Test whether the number of equations eliminated equal the number of essential iterative variables in this hierarchy. Since this is the case, continue.

XII. Reset the iterative variable locations except in those equations which have been eliminated. The resulting system structural matrix is

|       | $x_1$ | $x_2$ | $[x_3]$ | $[x_4]$ | $x_5$ |
|-------|-------|-------|---------|---------|-------|
| $f_1$ | 1     | 1     | 0       | 0       | 0     |
| $f_2$ | 1     | 1     | 0       | 0       | 0     |
| $f_3$ | 0     | 1     | 0       | 0       | 0     |
| $[f_4]$ | 0   | 0     | 0       | 0       | 0     |
| $[f_5]$ | 0   | 0     | 0       | 0       | 0     |

XIII. Test whether any variable frequency is "0" and that variable has not been eliminated. At this point it can be seen that the frequency of occurrence of variable $x_5$ has been reduced to "0," and that variable has not been eliminated.

XIV. Indicate that implicit iteration has just been detected. Further signify this by placing the variable that has contributed to the implicit iteration by enclosing it in brackets. The resulting system structural matrix now appears as follows.

|       | $x_1$ | $x_2$ | $[x_3]$ | $[x_4]$ | $[x_5]$ |
|-------|-------|-------|---------|---------|---------|
| $f_1$ | 1     | 1     | 0       | 0       | 0       |
| $f_2$ | 1     | 1     | 0       | 0       | 0       |
| $f_3$ | 0     | 1     | 0       | 0       | 0       |
| $[f_4]$ | 0   | 0     | 0       | 0       | 0       |
| $[f_5]$ | 0   | 0     | 0       | 0       | 0       |

III. Test whether all variables have been eliminated. Since variables $x_1$ and $x_2$ remain, continue.

IV. Calculate equation and variables frequencies.

Equation Frequency

| $f_1$ | $f_2$ | $f_3$ | $f_4$ | $f_5$ |
|-------|-------|-------|-------|-------|
| 2     | 2     | 1     | 0     | 0     |

Variable Frequency

| $x_1$ | $x_2$ | $x_3$ | $x_4$ | $x_5$ |
|-------|-------|-------|-------|-------|
| 2     | 3     | 0     | 0     | 0     |

V. Test whether the minimum equation frequency is equal to "1."

VIa. Eliminate equations with frequency equal to "1" and the variable contributing to that frequency. In this example, equation $f_3$ and variable $x_2$ will now be eliminated. The resulting system structural matrix is shown below.

|       | $x_1$ | $[x_2]$ | $[x_3]$ | $[x_4]$ | $[x_5]$ |
|-------|-------|---------|---------|---------|---------|
| $f_1$ | 1     | 0       | 0       | 0       | 0       |
| $f_2$ | 1     | 0       | 0       | 0       | 0       |
| $[f_3]$ | 0   | 0       | 0       | 0       | 0       |
| $[f_4]$ | 0   | 0       | 0       | 0       | 0       |
| $[f_5]$ | 0   | 0       | 0       | 0       | 0       |

III. Test whether all the variables have been eliminated. Variable $x_1$ remains; therefore continue.

IV. Calculate equation and variable frequencies.

Equation Frequency

| $f_1$ | $f_2$ | $f_3$ | $f_4$ | $f_5$ |
|-------|-------|-------|-------|-------|
| 1     | 1     | 0     | 0     | 0     |

Variable Frequency

| $x_1$ | $x_2$ | $x_3$ | $x_4$ | $x_5$ |
|-------|-------|-------|-------|-------|
| 2     | 0     | 0     | 0     | 0     |

V. Test whether the minimum equation frequency is equal to "1."

VIa. Eliminate equations with frequencies equal to "1" and the variable contributing to that frequency. Note that in this example problem, equation $f_1$ and equation $f_2$ both have frequencies equal to "1"; however, variable $x_1$ is the only variable appearing in each of these equations. Further note that implicit iteration has been detected. This being the case, the only way to close the loop in estimating a value of the variable $x_5$ and then calculating another value to determine whether or not an adjustment should be made in the initial guess of $x_5$ will be made by calculating the value of variable $x_1$ from both equation $f_1$ and equation $f_2$. If closure exists in that the value of variable $x_1$ from equation $f_1$ is equal to the value of variable $x_1$ from equation $f_2$, then the proper choice of value for the variable $x_5$ has been chosen. The system structural matrix, after eliminating these two equations and this variable, appears as follows.

|       | $[x_1]$ | $[x_2]$ | $[x_3]$ | $[x_4]$ | $[x_5]$ |
|-------|---------|---------|---------|---------|---------|
| $[f_1]$ | 0     | 0       | 0       | 0       | 0       |
| $[f_2]$ | 0     | 0       | 0       | 0       | 0       |
| $[f_3]$ | 0     | 0       | 0       | 0       | 0       |
| $[f_4]$ | 0     | 0       | 0       | 0       | 0       |
| $[f_5]$ | 0     | 0       | 0       | 0       | 0       |

III. Test whether all variables have been eliminated. Since this is now the case, the algorithm is terminated.

The calculational sequence in face of implicit iteration has just been determined for this example problem. An initial guess for the value of variable $x_5$ will be assumed. Using equation $f_5$, a value will be calculated for a variable $x_4$. Using this calculated value of variable $x_4$ and the initial estimate of variable $x_5$, equation $f_4$ will be used to calculate a value of variable $x_3$. Values of variable $x_3$ and variable $x_4$ will be used in equation $f_3$ to determine a value of variable $x_2$; variable $x_2$ and variable $x_3$ will be used in equation $f_2$ to determine a value of variable $x_1$. The value of the variable $x_2$ will also be used in equation $f_1$ to determine a second value for the variable $x_1$. If the two values of the variable $x_1$ just calculated are within a prescribed tolerance, the computational sequence is complete. If these two values do not agree, the computational procedure proceeds by determining a new estimate of the variable $x_5$ and going through the calculational sequence again. For convenience, this calculational sequence is represented in the table below.

| Sequence No. | Equation | Variable | Hierarchy Level |
|--------------|----------|----------|-----------------|
|              | Assume Variable | $x_5$ | 1 |
| 1            | $f_5$    | $x_4$    | 1               |
| 2            | $f_4$    | $x_3$    | 1               |
| 3            | $f_3$    | $x_2$    | 1               |
| 4            | $f_2$    | $x_1$    | 1               |
| 5            | $f_1$    | $x_1$    | 1               |
|              | Loop to Sequence 1 | | |

EXAMPLE V

Example of the Invention

Figure 3:
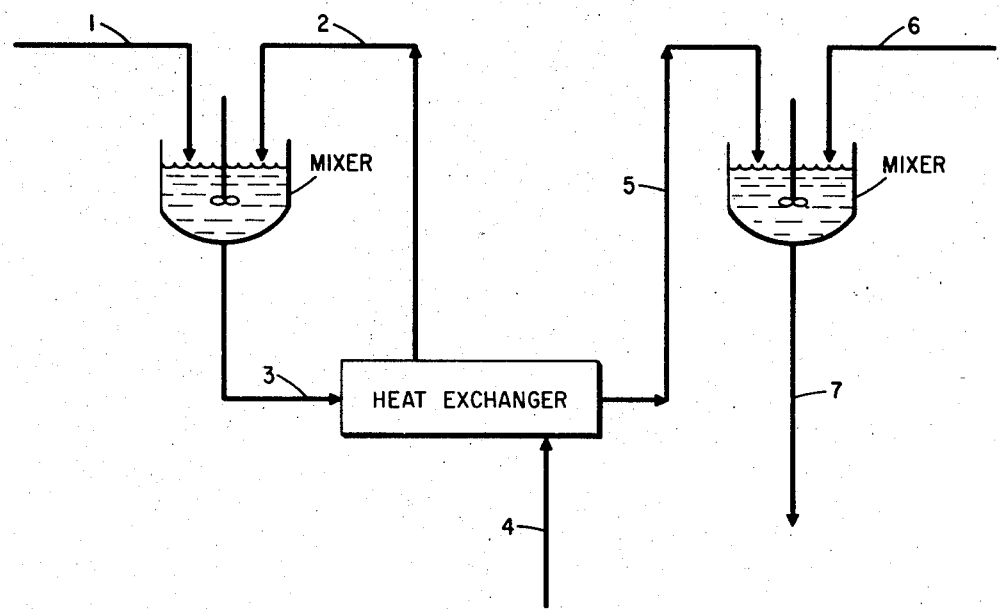
FIG. 3 is a block diagram depicting a portion of a chemical processing plant which will be used in Example V to show how this process design will be solved according to the present invention.

FIG. 3 is a flow diagram of a portion of a chemical processing plant. In this processing plant, a pure component 1 contained in Stream 1 is added to Stream 2 containing another pure component 2 in a mixer. The output of this mixer, Stream 3, then goes to a heat exchanger where it is used to cool an inlet stream to this heat exchanger, Stream 4. Because of certain physical processing steps in this plant, Stream 4 after being cooled, is renamed as Stream 2, the stream which is originally mixed with Stream 1. The outlet stream of this heat exchanger, Stream 5, proceeds to another mixer where it is added with Stream 6, containing components 3 and 4, forming Stream 7, a stream which then is used in physical processing elsewhere in the plant.

The process of this invention would proceed as follows:
1. Form the system structural matrix containing all of the variables and equations descriptive of the entire chemical plant processing scheme.
2. Use the algebraic operations depicted in FIG. 1 which define the elimination procedure such that the design and/or iterative variables necessary for solution of the set of equations and variables will be found.

3. Apply the algebraic manipulations depicted in FIG. 2 which define the computational sequence to be followed in determining the solution to the set of equations and variables.

4. Substitute actual numerical values for the variables into the equations in the order determined in the computational sequence in Step 3, solving or the unknown variables in the chemical plant processing scheme.

A system structural matrix can be formed by first defining the equations which are required in order to fully define this chemical plant processing scheme. A convenient method for keeping tract of which equations have been written is to write the equations descriptive of the processing streams, then to write the equations descriptive of each processing unit.

Table V-1 is a listing of all of the possible variables which would be contained in the chemical processing plant flow diagram shown in FIG. 3. For convenience, the variables associated with each process stream will be listed and followed by the variables associated with each of the three processing units as shown in FIG. 3. Table V-2 is a listing of the equations which would be written for the chemical processing flow diagram shown in FIG. 3. Since Streams 1, 2 and 4 only contain one component, equations describing the mole fraction relation for these streams are not required and, hence, are not written. Variables $x_{1,1}$, $x_{2,2}$, and $x_{2,4}$ may therefore be considered to be known variables. In the design of this system, several restrictions must be met. These restrictions are the following: the temperature of Stream 5 (Var. 25) must be held at a constant and known value and the mole fraction of component number 3 in Stream 6 (Var. 10) is also to be controlled. These variables could appear in the system structural matrix and be eliminated because they appear with "0" frequency. But for convenience, we have not shown them in the structural matrix. The system structural matrix is shown in FIG. 3a. An entry indicated by a "1" means that for that equation that particular variable appears in the relation as an unknown. A blank space is used to indicate that the variable is either known in that relation or does not appear. For this example problem, there are eight degrees of freedom. This may be obtained by subtracting the number of equations from the number of variables shown in the system structural matrix. After applying the elimination procedure of FIG. 1, we must find that there are eight design variables, and any number of other variables which are not eliminated will be iterative variables associated with various hierarchy levels as detected. The results of the elimination procedure (FIG. 1) are shown in Table V-3. The eight variables which were not eliminated must be design variables because the hierarchy level remained at "0." For this example problem, the proper choice of design variables results in a solution which does not involve iterative calculation even though it is clear that there is one physical recycle stream namely, Stream 2.

Choosing the design variables of Table V-3 and employing the computational sequence (FIG. 2) gives the results shown in Table V-4. This table shows which variable is solved for uniquely from which equation and also gives the sequence for the proper order of solution. For Example V, the solution sequence is a single-pass strategy since there are no iterative variables.

TABLE V-1

VARIABLE DESCRIPTION FOR EXAMPLE V

| Variable No. | Variable | Description |
| --- | --- | --- |
| 1 | $x_{1,1}$ | Mole Fraction Component 1 in Stream 1 |
| 2 | $x_{1,3}$ | Mole Fraction Component 1 in Stream 3 |
| 3 | $x_{1,5}$ | Mole Fraction Component 1 in stream 5 |
| 4 | $x_{1,7}$ | Mole Fraction Component 1 in Stream 7 |
| 5 | $x_{2,2}$ | Mole Fraction Component 2 in Stream 2 |
| 6 | $x_{2,3}$ | Mole Fraction Component 2 in Stream 3 |
| 7 | $x_{2,4}$ | Mole Fraction Component 2 in Stream 4 |
| 8 | $x_{2,5}$ | Mole Fraction Component 2 in Stream 5 |
| 9 | $x_{2,7}$ | Mole Fraction Component 2 in Stream 7 |
| 10 | $x_{3,6}$ | Mole Fraction Component 3 in Stream 6 |
| 11 | $x_{3,7}$ | Mole Fraction Component 3 in Stream 7 |
| 12 | $x_{4,6}$ | Mole Fraction Component 4 in Stream 6 |
| 13 | $x_{4,7}$ | Mole Fraction Component 4 in Stream 7 |
| 14 | $F_1$ | Molar Flow Rate, Stream 1 |
| 15 | $F_2$ | Molar Flow Rate, Stream 2 |
| 16 | $F_3$ | Molar Flow Rate, Stream 3 |
| 17 | $F_4$ | Molar Flow Rate, Stream 4 |
| 18 | $F_5$ | Molar Flow Rate, Stream 5 |
| 19 | $F_6$ | Molar Flow Rate, Stream 6 |
| 20 | $F_7$ | Molar Flow Rate, Stream 7 |
| 21 | $T_1$ | Temperature, Stream 1 |
| 22 | $T_2$ | Temperature, Stream 2 |
| 23 | $T_3$ | Temperature, Stream 3 |
| 24 | $T_4$ | Temperature, Stream 4 |
| 25 | $T_5$ | Temperature, Stream 5 |
| 26 | $T_6$ | Temperature, Stream 6 |
| 27 | $T_7$ | Temperature, Stream 7 |
| 28 | $A_2$ | Area of Heat Exchanger |
| 29 | $Q_2$ | Heat Duty of Heat Exchanger |
| 30 | $\Delta T_{lm}$ | Definition of Log Mean Temperature Difference |
| 31 | $t_1$ | Residence Time, Mixer 1 |
| 32 | $S_1$ | Volumetric Size, Mixer 1 |
| 33 | $t_3$ | Residence Time, Mixer 3 |
| 34 | $S_3$ | Volumetric Size, Mixer 3 |

TABLE V-2

EQUATION DESCRIPTION FOR EXAMPLE V

| Equation No. | Equation Type | Relationship |
| --- | --- | --- |
| 1 | Mole Fraction | $x_{1,3} + x_{2,3} = 1$ |
| 2 | Mole Fraction | $x_{1,5} + x_{2,5} = 1$ |
| 3 | Mole Fraction | $x_{4,6} = 1$ |
| 4 | Mole Fraction | $x_{1,7} + x_{2,7} + x_{4,7} = 1$ |
| 5 | Overall Flow Balance | $F_1 + F_2 = F_3$ |
| 6 | Component Balance | $F_1 x_{1,1} = F_3 x_{1,3}$ |
| 7 | Overall Energy Balance | $F_1 T_1 + F_2 T_2 = F_3 T_3$ |
| 8 | Equipment Relation | $S_1 = t_1 F_3 / \rho_3$ |
| 9 | Component | $x_{1,3} = x_{1,5}$ |
| 10 | Process Material Balance | $F_3 = F_5$ |
| 11 | Coolant Material Balance | $F_4 = F_2$ |
| 12 | Process Energy Balance | $C_{p3} F_3 T_3 = C_{p5} F_5 T_5$ |
| 13 | Coolant Energy Balance | $C_{p4} T_4 F_4 = C_{p2} T_2 F_2$ |

| 14 | $\Delta T_{1m}$ Definition | $\Delta T_{1m} = \dfrac{(T_2 - T_3) - (T_4 - T_5)}{\ln \dfrac{T_2 - T_3}{T_4 - T_5}}$ |
|---|---|---|
| 15 | Newton's Law of Cooling | $Q_2 = U_2 A_2 \Delta T_{1m}$ |
| 16 | Overall Flow Balance | $F_5 + F_6 = F_7$ |
| 17 | Component Material Balance | $F_5 x_{1,5} = F_7 x_{1,7}$ |
| 18 | Component Material Balance | $F_5 x_{2,5} = F_7 x_{2,7}$ |
| 19 | Component Material Balance | $F_6 x_{3,6} = F_7 x_{3,7}$ |
| 20 | Overall Energy Balance | $C_{p5} F_5 T_5 + C_{p6} F_6 T_6 = C_{p7} F_7 T_7$ |
| 21 | Equipment Relation | $S_3 = \iota_3 F_1 / \rho$ |

TABLE V-3
RESULTS OF ELIMINATION PROCEDURE FOR EXAMPLE V

| Hierarchy No. | Variables not Eliminated | Interpretation |
|---|---|---|
| 0 | Var. 27, $T_7$ | Design Variable |
| 0 | Var. 29, $Q_2$ | Design Variable |
| 0 | Var. 32, $S_1$ | Design Variable |
| 0 | Var. 34, $S_3$ | Design Variable |
| 0 | Var. 20, $F_7$ | Design Variable |
| 0 | Var. 24, $T_4$ | Design Variable |
| 0 | Var. 14, $F_1$ | Design Variable |
| 0 | Var. 16, $F_3$ | Design Variable |

TABLE V-4
RESULTS OF COMPUTATIONAL SEQUENCE FOR EXAMPLE V

| Sequence No. | Variable | Solved for from Equation |
|---|---|---|
| 1 | Var. 12, $x_{1,6}$ | Eqn 3, Mole Fraction |
| 2 | Var. 15, $F_2$ | Eqn 5, Overall Flow Balance |
| 3 | Var. 2, $x_{1,3}$ | Eqn 6, Component Balance |
| 4 | Var. 31, $\iota_1$ | Eqn 8, Equipment Relation |
| 5 | Var. 8, $F_5$ | Eqn 10, Process Material Balance |
| 6 | Var. 33, $\iota_3$ | Eqn 21, Equipment Relation |
| 7 | Var. 6, $x_{2,3}$ | Eqn 1, Mole Fraction |
| 8 | Var. 3, $x_{1,5}$ | Eqn 9, Component Equivalence |
| 9 | Var. 17, $F_4$ | Eqn 11, Coolant Material Balance |
| 10 | Var. 23, $T_3$ | Eqn 12, Process Energy Balance |
| 11 | Var. 19, $F_6$ | Eqn 16, Overall Flow Balance |
| 12 | Var. 8, $x_{2,5}$ | Eqn 2, Mole Fraction |
| 13 | Var. 22, $T_2$ | Eqn 13, Coolant Energy Balance |
| 14 | Var. 4, $x_{1,7}$ | Eqn 17, Component Material Balance |
| 15 | Var. 11, $x_{3,7}$ | Eqn 19, Component Material Balance |
| 16 | Var. 6, $T_6$ | Eqn 20, Overall Energy Balance |
| 17 | Var. 21, $T_1$ | Eqn 7, Overall Energy Balance |
| 18 | Var. 30, $T_{1m}$ | Eqn 14, Definition |
| 19 | Var. 28, $A_2$ | Eqn 15, Newton's Law of Cooling |
| 20 | Var. 9, $x_{2,7}$ | Eqn 18, Component Material Balance |
| 21 | Var. 13, $x_{4,7}$ | Eqn 4, Mole Fraction |

EXAMPLE VI

Example of the Invention

Figure 4:
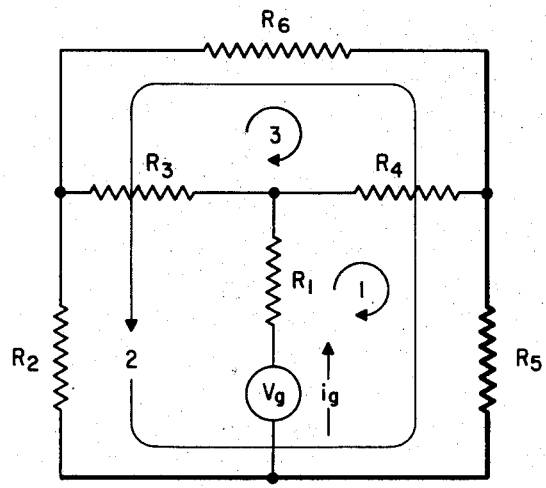
FIG. 4 is a block diagram depicting an electronic circuit which will be used in Example VI to show how this electronic design will be solved according to the present invention.

FIG. 4 is an electric circuit diagram of a resistor network with a current and voltage source. In this electrical network, certain limits must be placed on current passing through some of the resistors and it is desired to solve this problem under these constraints and determine the values of the other resistors and currents. The process of this invention would proceed as has been detailed in Examples I–V. The system structural matrix for this problem would be conveniently formed by first defining the equations and variables which are required in order to fully define this electrical circuit. As was mentioned earlier, certain current limits must be maintained for this example problem. They are the currents $i_4$, $i_5$, and $i_6$ which are the currents passing through those respective resistors.

Table VI–1 is a listing of the variables which would be contained in the circuit diagram. Table VI–2 is a listing of the equations which would be descriptive of the circuit diagram. In order to write the first three equations, the Kirkhoff voltage law equations, three loops were specified on FIG. 4. These loops are labeled on this figure for reference. Following the other conventions we have used, the system structural matrix is shown in FIG. 4a. An entry indicated by a "1" means that for that equation, that particular variable appears in the relation as an unknown. A blank is used to indicate that the variable is either known in that relation or does not appear. For this example problem, there is a maximum possible number of degrees of freedom equal to 10. However, we have previously stated that variables $i_4$, and $i_6$ are originally known because they represent the constraints on the system; therefore, the degrees of freedom of the system has been reduced to seven. Therefore, seven design variables and any number of other variables which will be iterative variables must be detected. The results of the elimination procedure (FIG. 1) are shown in Table VI–3. The seven variables which were not eliminated must be design variables because the hierarchy level remained at "0." For this example problem, the proper choice of the design variables has resulted in a solution which does not involve iterative calculation.

Choosing the design variables listed in Table VI–3 and employing the computational sequence (FIG. 2), the results shown in Table VI–4 are obtained. This table shows which variable is solved for uniquely from which equation and also gives the sequence for the proper order of solution. For Example VI, the solution sequence is a single pass strategy since there are no iterative variables.

TABLES VI-1
VARIABLE DESCRIPTION FOR EXAMPLE VI

| Variable No. | Variable | Description |
|---|---|---|
| 1 | $R_1$ | Resistance No. 1 |
| 2 | $R_2$ | Resistance No. 2 |
| 3 | $R_3$ | Resistance No. 3 |
| 4 | $R_4$ | Resistance No. 4 |
| 5 | $R_5$ | Resistance No. 5 |
| 6 | $R_6$ | Resistance No. 6 |
| 7 | $i_1$ | Current thru Resistor No. 1 |
| 8 | $i_2$ | Current thru Resistor No. 2 |
| 9 | $i_3$ | Current thru Resistor No. 3 |

| 10 | $i_4$ | Current thru Resistor No. 4 |
| 11 | $i_5$ | Current thru Resistor No. 5 |
| 12 | $i_6$ | Current thru Resistor No. 6 |
| 13 | $i_g$ | Current thru Generator |
| 14 | $V_g$ | Voltage Developed By Generator |

TABLE VI-2

EQUATION DESCRIPTION FOR EXAMPLE VI

| Equation No. | Equation Type | Relationship |
| --- | --- | --- |
| 1 | Kirchoff Voltage Law Loop No. 1 | $R_1 i_1 + R_4(i_1-i_3) + R_5(i_1-i_2) + V_g = 0$ |
| 2 | Kirchoff Voltage Law Loop No. 2 | $R_5(i_2-i_1) + R_2 i_2 + R_6(i_2-i_3) = 0$ |
| 3 | Kirchoff Voltage Law Loop No. 3 | $R_4(i_3-i_1) + R_6(i_3-i_2) + R_3 i_3 = 0$ |
| 4 | Current Equivalence | $i_1 = i_g$ |

TABLE VI-3

RESULTS OF ELIMINATION PROCEDURE FOR EXAMPLE VI

| Hierarchy No. | Variable Not Eliminated | Interpretation |
| --- | --- | --- |
| 0 | Var. 4, $R_4$ | Design Variable |
| 0 | Var. 5, $R_5$ | Design variable |
| 0 | Var. 6, $R_6$ | Design variable |
| 0 | Var. 7, $i_1$ | Design variable |
| 0 | Var. 8, $i_2$ | Design variable |
| 0 | Var. 9, $i_3$ | Design variable |
| 0 | Var. 14, $V_g$ | Design variable |

TABLE VI-4

RESULTS OF COMPUTATIONAL SEQUENCE OF EXAMPLE VI

| Sequence No. | Variable | Solved for from Equation |
| --- | --- | --- |
| 1 | Var. 1, $R_1$ | Eqn. 1, Kirchoff Voltage Law |
| 2 | Var. 2, $R_2$ | Eqn. 2, Kirchoff Voltage Law |
| 3 | Var. 3, $R_3$ | Eqn. 3, Kirchoff Voltage Law |
| 4 | Var. 4, $i_g$ | Eqn. 4, Current Equivalence |

EXAMPLE VII

Example of the Invention

Figure 5:
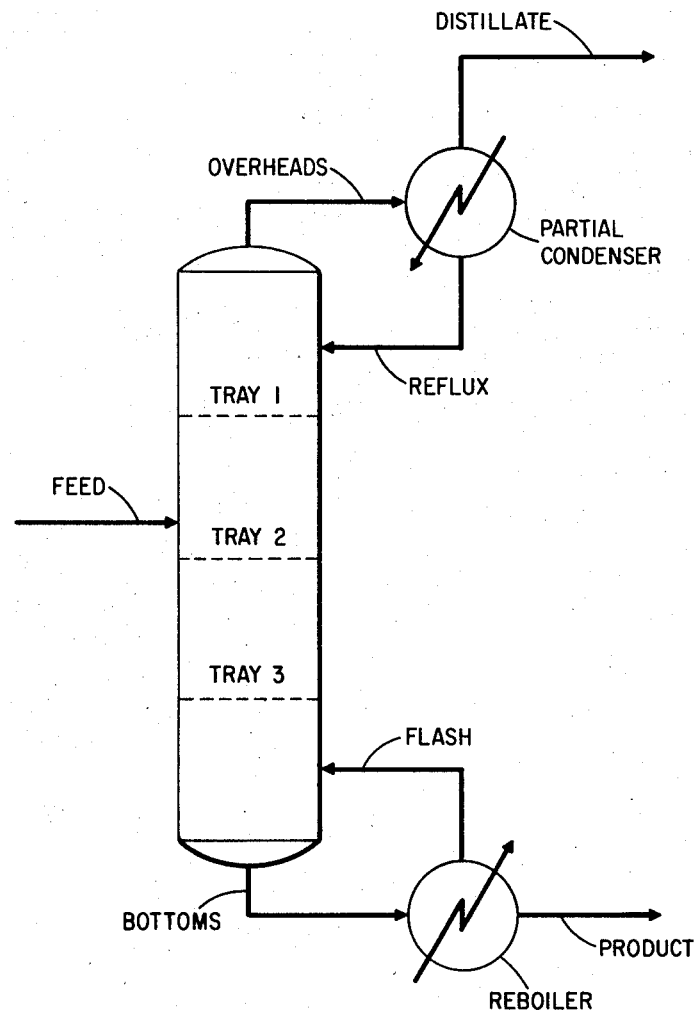
FIG. 5 is a block diagram depicting a distillation tower which will be used in Example VII to show how this process design will be solved according to the present invention.

FIG. 5 is a simplified schematic diagram of a distillation tower. This distillation tower consists of three trays, a partial condenser, and a reboiler. A binary (two-component) feed stream is introduced into this distillation tower on tray 2. It is desired to concentrate the low boiling component of the feed into the distillate stream, and to concentrate the high boiling component of the feed stream into the product stream. The solution of this distillation tower design problem would proceed according to the process of this invention as has been detailed in Examples I–VI. The system structural matrix for this problem would be formed after defining the equations and variables which would be required to fully define the problem. A typical design problem would be to determine the mass flow rates, compositions, and temperatures in all of the streams and at all locations in the distillation tower, if the feed composition, feed flow rate, and feed temperature were specified along with the heat duties of the partial condenser and the reboiler. Table VII-1 is a listing of all of the variables which would be required to fully define this distillation tower. Table VII-2 is a listing of all of the equations which would be descriptive of the distillation tower. Combining the variables and equations from Table VII-1 and Table VII-2, the system structural matrix for this problem could be formed. This system structural matrix would contain 62 variables and 56 equations. Because of its large size, this system structural matrix will not be shown here.

For this example problem, the number of degrees of freedom is equal to six. However, we have previously stated that the feed composition, feed flow rate, and feed temperature are known, and that the heat duties of the partial condenser and the reboiler are known. This has then specified five of the six degrees of freedom. We will further specify the pressure in the distillation column, reducing the degrees of freedom of the system structural matrix to zero. The elimination procedure (FIG. 1) is now applied to this system structural matrix. Results of this elimination procedure are shown in Table VII-3. In this example problem, the results of the elimination procedure show that five different levels of hierarchy containing 11 individual iterative variables are present. Further, it can be seen that nested loops are present. In hierarchy number 1, for example, two variables were not eliminated in the elimination procedure, and it is only necessary that the loop close on one variable. The remaining variable is then carried forward. In hierarchy number 2, there are three variables not eliminated and one variable carried forward from hierarchy number 1, making a total of four variables, and only two variables are essential for closure of this loop. Thus, the variable which was not solved for in hierarchy number 1 can either be carried forward beyond hierarchy level number 2 or can be solved for in hierarchy number 2. It should be noted at this point that Table VII-3 has been re-arranged such that the hierarchy labeled as "Number 1" was actually the last hierarchy level to be determined by the elimination procedure. Recall that in the calculational sequence (FIG. 2), the hierarchy levels must be used in a manner opposite to the manner in which they are detected in the elimination procedure (FIG. 1).

Choosing the design variables stated previously and employing the computational sequence procedure (FIG. 2), the results shown in Table VII-4 are obtained. This table shows which variable is solved for uniquely from which equation, and also gives the sequence for the proper order of solution. For Example VII, the solution sequence is a multiple pass strategy involving nested iterative loops, explicit iterative variables, and implicit iterative variables.

This example problem illustrates all of the embodiments of the invention. The computer programs which were used to obtain these results are attached to this patent application as Appendix 1.

TABLE VII-1

VARIABLE DESCRIPTION FOR EXAMPLE VII

| Variable No. | Variable | Description |
| --- | --- | --- |

| # | Symbol | Description |
|---|---|---|
| 1 | $V_c$ | Quantity of vapor in overheads |
| 2 | $Y_c$ | Fraction of component 1 in the vapor overhead |
| 3 | $Y_c'$ | Fraction of component 2 in the vapor overhead |
| 4 | $R$ | Quantity of reflux returned to the tower |
| 5 | $X_R$ | Fraction of component 1 in the liquid reflux |
| 6 | $X_R'$ | Fraction of component 2 in the liquid reflux |
| 7 | $D$ | Quantity of vapor in distillate |
| 8 | $Y_D$ | Fraction of component 1 in the vapor distillate |
| 9 | $Y_D'$ | Fraction of component 2 in the vapor distillate |
| 10 | $V_2$ | Quantity of vapor leaving Tray 2 |
| 11 | $Y_2$ | Fraction of component 1 in the vapor leaving Tray 2 |
| 12 | $Y_2'$ | Fraction of component 2 in the vapor leaving Tray 2 |
| 13 | $L_1$ | Quantity of liquid leaving Tray 1 |
| 14 | $X_1$ | Fraction of component 1 in the liquid leaving Tray 1 |
| 15 | $X_1'$ | Fraction of component 2 in the liquid leaving Tray 1 |
| 16 | $V_3$ | Quantity of vapor leaving Tray 3 |
| 17 | $Y_3$ | Fraction of component 1 in the vapor leaving Tray 3 |
| 18 | $Y_3'$ | Fraction of component 2 in the vapor leaving Tray 3 |
| 19 | $L_2$ | Quantity of liquid leaving Tray 2 |
| 20 | $X_2$ | Fraction of component 1 in the liquid leaving Tray 2 |
| 21 | $X_2'$ | Fraction of component 2 in the liquid leaving Tray 2 |
| 22 | $F$ | Feed to the distillation column |
| 23 | $Z_F$ | Fraction of component 1 in the feed (vapor and liquid) |
| 24 | $V_R$ | Vapor leaving the reboiler |
| 25 | $Y_R$ | Fraction of component 1 in the vapor leaving the reboiler |
| 26 | $Y_R'$ | Fraction of component 2 in the vapor leaving the reboiler |
| 27 | $L_3$ | Quantity of liquid leaving Tray 3 |
| 28 | $X_3$ | Fraction of component 1 in the liquid leaving Tray 3 |
| 29 | $X_3'$ | Fraction of component 2 in the liquid leaving Tray 3 |
| 30 | $B$ | Product Stream |
| 31 | $X_B$ | Fraction of component 1 in the liquid product stream |
| 32 | $X_B'$ | Fraction of component 2 in the liquid product stream |
| 33 | $H_c$ | Vapor enthalpy of the overhead stream |
| 34 | $h_R$ | Liquid enthalpy of the reflux stream |
| 35 | $H_D$ | Vapor enthalpy of the distillate stream |
| 36 | $Q_C$ | Heat duty of the partial condenser |
| 37 | $H_2$ | Vapor enthalpy of the vapors leaving Tray 2 |
| 38 | $h_1$ | Liquid enthalpy of the liquid leaving Tray 1 |
| 39 | $H_3$ | Vapor enthalpy of the vapors leaving Tray 3 |
| 40 | $h_2$ | Liquid enthalpy of liquids leaving Tray 2 |
| 41 | $h_F$ | Enthalpy of feed stream |
| 42 | $H_R$ | Vapor enthalpy of vapors leaving reboiler |
| 43 | $h_3$ | Liquid enthalpy of liquids leaving Tray 3 |
| 44 | $Q_R$ | Heat duty of reboiler |
| 45 | $h_B$ | Liquid enthalpy of product stream |
| 46 | $K_C$ | Equilibrium constant of component 1 in overheads |
| 47 | $K_C'$ | Equilibrium constant of component 2 in overheads |
| 48 | $T_C$ | Temperature in partial condenser |
| 49 | $K_1$ | Equilibrium constant of component 1 on Tray 1 |
| 50 | $K_1'$ | Equilibrium constant of component 2 on Tray 1 |
| 51 | $T_1$ | Temperature on Tray 1 |
| 52 | $K_2$ | Equilibrium constant of component 1 on Tray 2 |
| 53 | $K_2'$ | Equilibrium constant of component 2 on Tray 2 |
| 54 | $T_2$ | Temperature on Tray 2 |
| 55 | $K_3$ | Equilibrium constant of component 1 on Tray 3 |
| 56 | $K_3'$ | Equilibrium constant of component 2 on Tray 3 |
| 57 | $T_3$ | Temperature on Tray 3 |
| 58 | $K_R$ | Equilibrium constant of component 1 in the reboiler |
| 59 | $K_R'$ | Equilibrium constant of variable 2 in the reboiler |
| 60 | $T_R$ | Temperature in the reboiler |
| 61 | $Z_F'$ | Fraction of component 2 in the feed |
| 62 | $P$ | Operating pressure of the distillation tower |

TABLE VII-2

DESCRIPTION OF EQUATIONS FOR EXAMPLE VII

| Equation No. | Equation Type | Typical Relationship |
|---|---|---|
| 1 | Component balance, Component 1 in the condenser | $V_c Y_c - R x_R - D Y_D = 0$ |
| 2 | Component balance, Component 2 in the condenser | |
| 3 | Component balance, Component 1 on Tray 1 | |
| 4 | Component balance, Component 2 on Tray 1 | |
| 5 | Component balance, Component 1 on Tray 2 | |
| 6 | Component balance, Component 2 on Tray 2 | |
| 7 | Component balance, Component 1 on Tray 3 | |
| 8 | Component balance, Component 2 on Tray 3 | |
| 9 | Component balance, Component 1 in the reboiler | |
| 10 | Component balance, Component 2 in the reboiler | |
| 11 | Energy balance on the condenser | $H_c V_c - h_r R - H_D D - Q_c = 0$ |
| 12 | Energy balance on Tray 1 | |
| 13 | Energy balance on Tray 2 | |
| 14 | Energy balance on Tray 3 | |
| 15 | Energy balance on reboiler | |
| 16 | Component equilibrium relation, Component 1 in the condenser | $Y_D - K_C X_R = 0$ |
| 17 | Component equilibrium relation, Component 2 in the condenser | |
| 18 | Component equilibrium relation, Component 1 Tray 1 | |
| 19 | Component equilibrium relation, Component 2 Tray 1 | |
| 20 | Component equilibrium relation, Component 1 Tray 2 | $Y_D - K_C X_R = 0$ |
| 21 | Component equilibrium relation, Component 2 Tray 2 | |
| 22 | Component equilibrium relation, Component 1 Tray 3 | |
| 23 | Component equilibrium relation, Component 2 Tray 3 | |
| 24 | Component equilibrium relation, Component 1 reboiler | |
| 25 | Component equilibrium relation, Component 2 reboiler | |
| 26 | Definition of equilibrium relation, Component 1 condenser | $K_c = f(T_c)$ |
| 27 | Definition of equilibrium relation, Component 2 condenser | |
| 28 | Definition of equilibrium relation, Component 1 Tray 1 | |
| 29 | Definition of equilibrium relation, Component 2 Tray 1 | |
| 30 | Definition of equilibrium relation, Component 1 Tray 2 | |
| 31 | Definition of equilibrium relation, Component 2 Tray 2 | |
| 32 | Definition of equilibrium relation, Component 1 Tray 3 | |
| 33 | Definition of equilibrium relation, Component 2 Tray 3 | |
| 34 | Definition of equilibrium relation, Component 1 reboiler | |

| | | |
|---|---|---|
| 35 | Definition of equilibrium relation, Component 2 reboiler | |
| 36 | Definition of molal vapor enthalpy, condenser | $H_D = f(Y_D, Y_D', T_C)$ |
| 37 | Definition of molal vapor enthalpy, Tray 1 | |
| 38 | Definition of molar vapor enthalpy, Tray 2 | |
| 39 | Definition of molal vapor enthalpy, Tray 3 | |
| 40 | Definition of molal vapor enthalpy, reboiler | |
| 41 | Definition of molal liquid enthalpy, condenser | $h_R = f(X_D, X_D', T_C)$ |
| 42 | Definition of molal liquid enthalpy, Tray 1 | |
| 43 | Definition of molal liquid enthalpy Tray 2 | |
| 44 | Definition of molal liquid enthalpy, Tray 3 | |
| 45 | Definition of molal liquid enthalpy, reboiler | |
| 46 | Definition of vapor mole fraction, condenser | |
| 47 | Definition of vapor mole fraction, Tray 1 | $\Sigma y = 1$ |
| 48 | Definition of vapor mole fraction, Tray 2 | |
| 49 | Definition of vapor mole fraction, Tray 3 | |
| 50 | Definition of vapor mole fraction, reboiler | |
| 51 | Definition of liquid mole fraction, condenser | |
| 52 | Definition of liquid mole fraction, Tray 1 | $\Sigma x = 1$ |
| 53 | Definition of liquid mole fraction, Tray 2 | |
| 54 | Definition of liquid mole fraction, Tray 3 | |
| 55 | Definition of liquid mole fraction, reboiler | |
| 56 | Definition of mole fraction relation in feed | $Z_F + Z_F' = 1$ |

TABLE VII-3

RESULTS OF ELIMINATION PROCEDURE FOR EXAMPLE VII

| Hierarchy No. | Variables Not Eliminated | No. of Essential Iterative Variables | Interpretation |
|---|---|---|---|
| 0 | None | — | — |
| 1 | Var. 59 | 1 | Iterative Variables(s) Hierarchy 1 or higher |
| 2 | Var. 32 | | |
| | Var. 30 | 2 | Iterative variable(s) Hierarchy 2 or higher |
| | Var. 29 | | |
| | Var. 27 | | |
| 3 | Var. 21 | 2 | Iterative variable(s) Hierarchy 3 or higher |
| | Var. 19 | | |
| 4 | Var. 15 | 1 | Iterative Variable(s) Hierarchy 4 or higher |
| | Var. 13 | | |
| 5 | Var. 6 | 5 | Iterative Variable(s) for Hierarchy 5 |
| | 4 | | |

TABLE VII-4

RESULTS OF COMPUTATIONAL SEQUENCE FOR EXAMPLE VII

| Sequence No. | Variable | Solved for in Equation |
|---|---|---|
| 1 | Var. 23 | Eqn. 56 |
| | Assume Variables 32 and 59 | |
| 2 | Var. 26 | Eqn. 25 |
| 3 | Var. 60 | Eqn. 35 |
| | Implicit Iteration | Detected—Variable 59 |
| 4 | Var. 58 | Eqn. 34 |
| 5 | Var. 25 | Eqn. 50 |
| 6 | Var. 31 | Eqn. 24 |
| 7 | Var. 42 | Eqn. 40 |
| 8 | Var. 32 | Eqn. 55 |
| | Loop to Sequence 2 | until Variable 32 converges |
| 9 | Var. 45 | Eqn. 45 |
| | Assume Variables 27, 29 and 30 | |
| 10 | Var. 24 | Eqn. 10 |
| 11 | Var. 28 | Eqn. 54 |
| 12 | Var. 27 | Eqn. 9 |
| | Loop to Sequence 10 | until Variable 27 converges |
| 13 | Var. 43 | Eqn. 15 |
| | Implicit Iteration | Detected—Variable 30 |
| 14 | Var. 57 | Eqn. 44 |
| 15 | Var. 55 | Eqn. 32 |
| 16 | Var. 56 | Eqn. 33 |
| 17 | Var. 17 | Eqn. 22 |
| 18 | Var. 18 | Eqn. 49 |
| 19 | Var. 29 | Eqn. 23 |
| | Loop to Sequence 10 | until Variable 29 converges |
| 20 | Var. 39 | Eqn. 39 |
| | Assume Variables 19 and 21 | |
| 21 | Var. 16 | Eqn. 8 |
| 22 | Var. 20 | Eqn. 53 |
| 23 | Var. 19 | Eqn. 7 |
| | Loop to Sequence 21 | until Variables 19 converges |
| 24 | Var. 40 | Eqn. 14 |
| 25 | Var. 54 | Eqn. 43 |
| 26 | Var. 52 | Eqn. 30 |
| 27 | Var. 53 | Eqn. 31 |
| 28 | Var. 11 | Eqn. 20 |
| 29 | Var. 12 | Eqn. 48 |
| 30 | Var. 21 | Eqn. 21 |
| | Loop to Sequence 21 | until Variables 21 converges |
| 31 | Var. 37 | Eqn. 38 |
| | Assume Variable 13 | |
| 32 | Var. 10 | Eqn. 6 |
| 33 | Var. 14 | Eqn. 52 |
| 34 | Var. 13 | Eqn. 5 |
| | Loop to Sequence 32 | until Variable 13 converges |
| 35 | Var. 38 | Eqn. 13 |
| | Assume Variables 4, 6 and 15 | |
| 36 | Var. 51 | Eqn. 42 |
| 37 | Var. 5 | Eqn. 51 |
| 38 | Var. 49 | Eqn. 28 |
| 39 | Var. 50 | Eqn. 29 |
| 40 | Var. 2 | Eqn. 18 |
| 41 | Var. 3 | Eqn. 47 |
| 42 | Var. 15 | Eqn. 19 |
| | Loop to Sequence 36 | until Variable 15 converges |
| 43 | Var. 33 | Eqn. 37 |
| 44 | Var. 1 | Eqn. 3 |
| 45 | Var. 4 | Eqn. 4 |
| | Loop to Sequence 36 | until Variable 4 converges |
| 46 | Var. 34 | Eqn. 12 |
| 47 | Var. 48 | Eqn. 41 |
| 48 | Var. 46 | Eqn. 26 |
| 49 | Var. 47 | Eqn. 27 |
| 50 | Var. 8 | Eqn. 16 |
| 51 | Var. 7 | Eqn. 1 |
| 52 | Var. 9 | Eqn. 46 |
| 53 | Var. 6 | Eqn. 2 |
| | Loop to Sequence 36 | until Variable 6 converges |
| 54 | Var. 35 | Eqn. 11 |
| 55 | Var. 6 | Eqn. 17 |
| | Loop to Sequence 2 until Variable 6 converges to the value calculated in Sequence No. 53 | |
| 56 | Var. 35 | Eqn. 36 |
| | Loop to Sequence 2 until Variable 35 converges to the value calculated in Sequence No. 54 | |

APPENDIX A

```
BEGIN
COMMENT * * * * * * * * * * * * * * * * * * * * * * * * * * * * * * * * *           00000000*  1   USTMT
        *                    E L I M I N A T I O N                       *           00001000*  2   U
        * * * * * * * * * * * * * * * * * * * * * * * * * * * * * * * * *           00002000*  2   U
        DEFINITION OF IMPORTANT GLOBAL VARIABLES:                                    00003000*  2   U
            BIGBOOL = SYSTEM STRUCTURAL MATRIX CONSISTING OF                         00004000*  2   U
                      1'S AND 0'S RELATING THE EQUATIONS AND                         00005000*  2   U
                      VARIABLES                                                      00006000*  2   U
            E = NUMBER OF EQUATIONS                                                  00007000*  2   U
            BBJ = NUMBER OF VARIABLES                                                00008000*  2   U
            HIER = HIERARCHY LEVELS OF THE ITERATIVE VARIABLES                       00009000*  2   U
            DESIGNVAR = THE NUMBER OF DESIGN VARIABLES FOR THIS                      00010000*  2   U
                        PROBLEM ( EQUAL TO THE DEGREES OF FREEDOM                    00011000*  2   U
                        OF THE SYSTEM STRUCTURAL MATRIX (DEGOF))                     00012000*  2   U
            RECYCLEVAR = THE NUMBER OF ITERATIVE VARIABLES                           00013000*  2   U
                         DETECTED IN THIS PROBLEM                                    00014000*  2   U
            VARNUTELIM = THE TOTAL NUMBER OF DESIGN AND                              00015000*  2   U
                         ITERATIVE VARIABLES                                         00016000*  2   U
            KUMELIM = BOOLEAN KEEPING ACCOUNT OF WHICH                               00017000*  2   U
                      EQUATIONS HAVE BEEN ELIMINATED                                 00018000*  2   U
            COLELIM = BOOLEAN KEEPING ACCOUNT OF WHICH                               00019000*  2   U
                      VARIABLES HAVE BEEN ELIMINATED                                 00020000*  2   U
            FRE = VARIABLE FREQUENCY                                                 00021000*  2   U
            EQNFRE = EQUATION FREQUENCY                                              00022000*  2   U
            MFRE = ARRAY OF EQUATIONS CONTAINING THE MINIMUM                         00023000*  2   U
                   FREQUENCY VARIABLE                                                00024000*  2   U
                                                                                     00025000*  2   U
                                                                                     00026000*  2   U
FILE IN         CARD(2,10);                                                          00027000*  2   U
FILE OUT        LINE 4 (2,15);                                                       00028000*  2   U
INTEGER         I,J,BEGINX,BBJ,K,L,M,N;                                              00029000*  2   U
LABEL           AGAIN, FINI;                                                         00030000*  2   U
AGAIN:          READ(CARD,<15,15>, EQINX ,BBJ)[FINI];                                00031000*  2   U
COMMENT         EQINX (NO. OF EQUATIONS+1) AND BBJ (NO. OF VARIABLES)                00032000*  2   U
                ARE READ IN AND USED TO DYNAMICALLY DIMENSION THIS RUN;              00033000*  2   U
        BEGIN                                                                        00034000*  2   U
INTEGER ARRAY   BIGBOOL[0:BBJ,0:EQINX-1];                                            00035000*  2   U
BOOLEAN ARRAY   KUMELIN[0:EQINX-1], COLELIM[0:BBJ];                                  00036000*  2   U
COMMENT * * * * * * * ELIMINATION PROCEDURE FOLLOWS * * * * * * * * * *;             00037000*  4   DSTMT
PROCEDURE       ELIMINATION;                                                         00038000*  4   U
        BEGIN                                                                        00039000*  4   U
INTEGER         DESIGNVAR, RECYCLEVAR, VARNUTELIM, MFREQ, E, NCUMF,MFIRX,            00040000*  4   U
                TI,MFGROUND, MFNUM1,KUMNUTELIM;                                      00041000*  5   USTMT
INTEGER         HIER;                                                                00042000*  5   U
INTEGER         ZEROCOLM, DEGOF;                                                     00043000*  5   U
ARRAY           MFIRE[0:EQINX-1],FRE[0:BBJ,1:28],MFRE[0:EQINX-1],                    00044000*  5   U
                EQNFRE[0:EQINX-1];                                                   00045000*  5   U
LABEL           L10,L20,L30,L40,L50,L100;                                            00046000*  5   U
                L + EQINX-1;            HIER + 0;                                    00047000*  5   13
                KUMNUTELIM + 0;                                                      00048000*  5   15
```

```
        WRITECLINE[PAGE]);
        WRITELINE,</////, X10, "ELIMINATION RES",       *  00049100*    5     18
        "ULTS",///>);                                    *  00049200*    0     20
                                                                                     PMI SIZE  18 MDS
            FOR I + 1 STEP 1 UNTIL BBJ DO                *  00050000*    5     23
    BEGIN                                                *  00051000*    5     25
        FRE[I] + 0;                                      *  00052000*    5     25
        CULELIM[I] + FALSE;                              *  00053000*    5     28
    END;
            FOR I + 1 STEP 1 UNTIL E DO                  *  00054000*    5     29
        ROWELIM[I] + FALSE;                              *  00055000*    5     31
COMMENT COMPUTE INITIAL FREQUENCY;
            FOR I + 1 STEP 1 UNTIL E DO                  *  00056000*    5     33
    BEGIN                                                *  00057000*    5     30
            FOR J + 1 STEP 1 UNTIL BBJ DO                *  00058000*    5     30
        BEGIN                                            *  00059000*    5     38
            EQNFRE[I] + EQNFRE[I] + BIGBOOL[J,I];        *  00060000*    5     38
            FRE[J] + FRE[J] + BIGBOOL[J,I];              *  00061000*    5     37
        END;
            IF EQNFRE[I] = 0 THEN                        *  00062000*    5     39
        BEGIN                                            *  00063000*    5     42
            ROWELIM[I] + TRUE;                           *  00064000*    5     47
            ROWNOTELIM + ROWNOTELIM + 1;                 *  00065000*    5     51
        END;                                             *  00066000*    5     52
    END;                                                 *  00067000*    5     52
        DEGOF + BBJ - E - ROWNOTELIM;                    *  00068000*    5     54
        WRITELINE,<"//"IN ELIMINATION ROUTINE",          *  00069000*    5     55
        "STRUCTURAL MATRIX = ",13>, DEGOF); WRITE(LINE[UBL]); *  00070000* 5  55
        ZEROCOLM + 0;                                    *  00071000*    5     57
        WRITELINE,<//"IN ELIMINATION ROUTINE";           *  00072000*    5     59
        " VARIABLES WITH ZERO FREQUENCY FOLLOW:"/>);     *  00073000*    7     61
                                                                                     PMI SIZE  14 MDS
            FOR J + 1 STEP 1 UNTIL BBJ DO                *  00074000*    5     71
    BEGIN                                                *  00075000*    5     72
            IF FRE[J] = 0 THEN                           *  00076000*    8     73
        BEGIN                                                                        PMI SIZE  17 MDS
            ZEROCOLM + ZEROCOLM + 1;                     *  00077000*    5     75
            CULELIM[J] + TRUE;                           *  00078000*    5     76
            WRITELINE,<<25,13>, J>);                     *  00079000*    5     77
        END;                                             *  00080000*    5     79
    END;                                                 *  00081000*    5     80
        GO TO L20;                                       *  00082000*    5     82
COMMENT  A CHECK IS MADE HERE TO SEE IF ALL EQNS HAVE BEEN ELIM.;
L10:        FOR I + 1 STEP 1 UNTIL E DO                  *  00083000*    5     85
            IF NOT ROWELIM[I] THEN GO TO L20;            *  00084000*    5     87
        GO TO L100;                                      *  00085000*    5     89
COMMENT  CALCULATE FREQUENCY;                                                        PMI SIZE  5 MDS
L20:        FOR J + 1 STEP 1 UNTIL BBJ DO                *  00086000*    5     89
            IF FRE[J] > 0 THEN                           *  00087000*    5     91
        FRE[J] + 0;                                      *  00088000*    5     92
            FOR J + 1 STEP 1 UNTIL BBJ DO                *  00089000*    5     92
                                                         *  00090000*    5     93
                                                         *  00091000*    5     90
                                                         *  00092000*    5     90
                                                         *  00093000*    5     98
                                                         *  00094000*    5     101
                                                         *  00095000*    5     107
```

```
                 IF NOT CULELIM(J) THEN                          * 00096000*    5    105
                 FUR I + 1 STEP 1 UNTIL E  DO                    * 00097000*    5    105
                 IF NOT RUWELIM(I) THEN                          * 00098000*    5    110
                 IF FRE(I) ≥ 0 THEN                              * 00099000*    5    110
                 FRE(I) + FRE(I) + BIGBUOL(J,I);                 * 00100000*    5    114
      COMMENT    STORE COLS WITH MIN. FREW. IN MFRE ARRAY;       * 00101000*    5    120
                 MFRE + =10; MFINA + 1; NCUMF + 0;               * 00102000*    5    120
                 FOR J + 1 STEP 1 UNTIL NBJ DO                   * 00103000*    5    126
           BEGIN IF I1 + FRE(J) > 0 THEN                         * 00104000*    5    131
           BEGIN IF I1 = 1 THEN                                  * 00105000*    5    134
                                                                 * 00106000*    5
           BEGIN NCUMF + NCUMF +1;                               * 00107000*    5    135
                 MFRE(MFINA) + J;                                * 00108000*    5    135
                 MFRE + I;                                       * 00109000*    5    136
                 MFINA + MFINA+1;                                * 00110000*    5    137
           END   ELSE                                            * 00111000*    5    138
                 IF I1 < MFRE THEN                               * 00112000*    5    139
           BEGIN                                                 * 00113000*    5    140
                 MFRE + I1;                                      * 00114000*    5    140
                 MFGRUNE + J;                                    * 00115000*    5    142
           END;                                                  * 00116000*    5    142
           END;                                                  * 00117000*    5    143
           END   J LOOP;                                         * 00118000*    5    144
      L30: IF MFREG = 1 THEN GO TO L40;                          * 00119000*    5    144
                 IF MFREG=10 THEN GO TO L100;                    * 00120000*    5    146
      COMMENT    MINIMUM FREQUENCY IS GREATER THAN 1;            * 00121000*    5    146
                 MFREGM1 + MFREM-1;              HIER + HIER + 1;* 00122000*    5    149
                 FOR I + 1 STEP 1 UNTIL BBJ DO                   * 00124000*    5    149
                 IF FRE(I) = 0 AND NOT COLELIM(I) THEN           * 00125000*    5    152
           BEGIN                                                 * 00126000*    5    154
                 FRE(I) + -1;                                    * 00127000*    5    156
                 WRITE(LINE,<11>,I);                             * 00128000*    5    156
                                                                 * 00129000*    5    162
           END;                                                  * 00130000*    5    169
                 WRITE(LINE,<"HIERARCHY LEVEL = ",I2>, HIER);    * 00131000*    5    171
                                                                                FMT SIZE 4 MDS
                 WRITE(LINE,<I2," ITERATIVE VARIABLE(S) FOUND">,MFREGM1)); * 00132000* 5 179
                                                                                FMT SIZE 7 MDS
      COMMENT    ELIMINATE ROWS WITH ENTRY IN COL NO MFGRUNE;    * 00133000*    5    187
                 J + 0;                                          * 00134000*    5    187
                 FOR I + 1 STEP 1 UNTIL E DO                     * 00135000*    5    188
                 IF NOT RUWELIM(I) AND BIGBOOL(MFGRUNE,I) = 1 THEN * 00136000* 5    189
           BEGIN RUWELIM(I) + TRUE;                              * 00137000*    5    191
                 J + J+1;                                        * 00138000*    5    192
                 IF J = MFREGM1 THEN GO TO L10;                  * 00139000*    5    193
           END;                                                  * 00140000*    5    194
      COMMENT    MINIMUM FREQUENCY IS EQUAL TO 1;                * 00141000*    5    196
      L40: FOR J + 1 STEP 1 UNTIL NCUMF DO                       * 00142000*    5    198
           BEGIN J + MFRE(I);                                    * 00143000*    5    198
                                                                 * 00144000*    5    200
                                                                 * 00145000*    5    200
```

```
            FOR K + 1 STEP 1 UNTIL E DO                            * 00146000*      5    201
            IF BIGBOOL(J,K) = 1 AND NOT NUMELIM(K) THEN             * 00147000*      5    202
         BEGIN                                                      * 00148000*      5    204
            NUMELIM(K) + TRUE;                                      * 00149000*      5    205
            COLELIM(J) + TRUE;                                      * 00150000*      5    206
            GO TO L50;                                              * 00151000*      5    207
            END;                                                    * 00152000*      5    208
L50:        END;                                                    * 00153000*      5    210
            GO TO L10;                                              * 00154000*      5    213
   COMMENT  COMPUTE NUMBER OF VARIABLES NOT ELIMINATED, DESIGN      * 00155000*      5    213
            VARIABLES, AND ITERATIVE VARIABLES;                     * 00156000*      5    213
L100:       IF DEGOF > 0 OR HIER > 0 THEN WRITE(LINE,<"VARIABLES ", * 00156100*      5    213
            "NOT ELIMINATED ">);                                    * 00156200*     13    218
                                                                              FMT SIZE  9 MDS
            FOR I + 1 STEP 1 UNTIL BBJ DO                           * 00157000*      5    219
            IF NOT COLELIM(I) THEN                                  * 00158000*      5    220
         BEGIN                                                      * 00159000*      5    220
            VARNOTELIM + VARNOTELIM +1;                             * 00160000*      5    221
            WRITE(LINE,<X25,15>, I));                               * 00160100*      5    222
   COMMENT  STORE VARIABLES IN MFONE ARRAY;                         * 00161000*      5    230
            MFONE[VARNOTELIM] + I;                                  * 00162000*      5    230
            END;                                                    * 00163000*      5    231
            DESIGNVAR + BBJ - E-ZEROCOLM + RUMNOTELIM;               * 00164000*      5    233
            RECYCLEVAR + VARNOTELIM - DESIGNVAR;                    * 00165000*      5    236
            WRITE(LINE,<"TOTAL NUMBER OF SYSTEM EQUATIONS = ",15/   * 00166000*      5    237
            "TOTAL NUMBER OF EQUATIONS CONTAINING UNKNOWNS =",15/   * 00167000*     15    239
            "TOTAL NUMBER OF UNKNOWN VARIABLES =",15/               * 00168000*     15    239
            "TOTAL NUMBER OF SYSTEM VARIABLES =",15/>,E-RUMNOTELIM, * 00169000*     15    239
                                                                              FMT SIZE 38 MDS
            BBJ-ZEROCOLM, BBJ);                                     * 00170000*      5    243
            WRITE(LINE,<"NUMBER OF VARIABLES NOT ELIMINATED = ",14, * 00171000*      5    252
            /" NUMBER OF DESIGN VARIABLES = ",14,*                  * 00172000*     16    254
            /" NUMBER OF ITERATIVE VARIABLES = ",14>                * 00173000*     16    254
            ,VARNOTELIM,DESIGNVAR,RECYCLEVAR));                     * 00174000*     30    263
                                                                              FMT SIZE 30 MDS
            END OF ELIMINATION;                                     * 00175000*    271    SEG SIZE MDS

IN THE ABOVE PROCEDURE, THE FOLLOWING GLOBAL VARIABLES ARE USED:

EQINX I-    BBJ   COLEL, RUMEL, J    BIGBO, K
   COMMENT  READ IN SYSTEM STRUCTURAL MATRIX OFF OF PUNCHED CARDS;  * 00176000*      4     12
            FOR I + 1 STEP 1 UNTIL EQINX-1 DO                       * 00177000*      4     12
         BEGIN                                                      * 00178000*      4     17
            READ(CARD,<8011>, FOR J + 1 STEP 1 UNTIL BBJ DO         * 00179000*      4     17
                                                                              FMT SIZE  4 MDS
            BIGBOOL(J,I));                                          * 00180000*      4     23
            END;                                                    * 00181000*      4     30
   COMMENT  CALL ELIMINATION HERE;                                  * 00182000*      4     31
            ELIMINATION;                                            * 00183000*      4     31
            END;                                                    * 00183100*      4     31
                                                                              SEG SIZE 35 MDS
FINI:       END OF PROGRAM.                                         * 00184000*      2     19
```

```
COMMENT       BEGIN
        *                                                              *   00000000*   1  DSTMT
        *   *   *   *   *   *   *   *   *   *   *   *   *   *   *   *  *   00001000*   2   0
        *                                                              *   00002000*   2   0
        *     C A L C U L A T I O N A L   S E Q U E N C E              *   00003000*   2   0
        *                                                              *   00004000*   2   0
        *   *   *   *   *   *   *   *   *   *   *   *   *   *   *   *  *   00005000*   2   0
        *                                                              *   00006000*   2   0
        *   THIS PROGRAM DETERMINES (IN CONJUNCTION WITH                *   00007000*   2   0
        *   THE ELIMINATION PROGRAM) THE CALCULATIONAL SEQUENCE TO      *   00008000*   2   0
        *   BE FOLLOWED IN PERFORMING THE NUMERICAL CALCULATIONS;       *   00009000*   2   0
        *   DEFINITION OF IMPORTANT GLOBAL VARIABLES:                   *   00010000*   2   0
        *   BIGBOOL = MATRIX OF 1-S AND 0-S RELATING EQUATIONS          *   00011000*   2   0
        *            AND VARIABLES AS DETERMINED IN PHASE 1             *   00012000*   2   0
        *   E = NUMBER OF EQUATIONS                                     *   00013000*   2   0
        *   NBJ = NUMBER OF VARIABLES                                   *   00014000*   2   0
        *   DESIGN = NUMBER OF DESIGN VARIABLES                         *   00015000*   2   0
        *   RCVAR = NUMBER OF ITERATIVE VARIABLES                       *   00016000*   2   0
        *   DEIG:DESIGNJ = ARRAY OF DESIGN VARIABLE NUMBERS             *   00017000*   2   0
        *   RCIOHIER,OIRCVARJ = ARRAY OF ITERATIVE VARIABLE             *   00018000*   2   0
        *            NUMBERS AND THE HIERARCHY OF ASSUMING -            *   00019000*   2   0
        *   THE ZEROTH COLUMN CONTAINS THE NUMBER OF                    *   00020000*   2   0
        *            ITERATIVE VARIABLES TO BE ASSUMED AT THE           *   00021000*   2   0
        *            CORRESPONDING HIERARCHY LEVEL                      *   00022000*   2   0
        *   THE FIRST COLUMN CONTAINS THE NUMBER OF                     *   00023000*   2   0
        *            ITERATIVE VARIABLES TO BE SOLVED FOR IN            *   00024000*   2   0
        *            THE CORRESPONDING HIERARCHY                        *   00025000*   2   0
        *   IMPLICIT = BOOLEAN VARIABLE TELLING WHAT TYPE OF            *   00026000*   2   0
        *            ITERATION LOOP HAS BEEN DETECTED                   *   00027000*   2   0
        *   ROWELIMI0:EJ = BOOLEAN KEEPING ACCOUNT OF WHICH             *   00028000*   2   0
        *            EQUATIONS HAVE BEEN ELIMINATED                     *   00029000*   2   0
        *   COLELIMI0:BBJJ = BOOLEAN KEEPING ACCOUNT OF WHICH           *   00030000*   2   0
        *            VARIABLES HAVE BEEN ELIMINATED                     *   00031000*   2   0
        *   COLFREQ:BBJJ = VARIABLE FREQUENCY                           *   00032000*   2   0
        *   FREQ:EJ = EQUATION FREQUENCY                                *   00033000*   2   0
        *   RECSAVEDIE,OIRCVARJ = ACCOUNTING ARRAY FOR KEEPING          *   00034000*   2   0
        *            TRACK OF TEMPORARILY ASSUMED VARIABLES             *   00035000*   2   0
        *   SEQ(0:EJ = THE EQUATION NUMBERS IN SEQUENCE OF THE          *   00036000*   2   0
        *            SOLUTION                                            *   00037000*   2   0
        *   SVARIO:BJ = THE VARIABLE NUMBERS IN SEQUENCE OF THE         *   00038000*   2   0
        *            SOLUTION                                            *   00039000*   2   0
        *                                                              *   00040000*   2   0
        *   DATA DECK MADE UP AS FOLLOWS:                              *   00041000*   2   0
        *   ONE ALPHA HEADER CARD (13A6,X2)                            *   00042000*   2   0
CARD 1:    DIMENSIONING CARD, 10I5 FORMAT, INFORMATION IS                  00043000*   2
CARD 2:       1. E = NUMBER OF EQUATIONS                                   00044000*   2
              2. BBJ = NUMBER OF VARIABLES                                 00045000*   2
              3. RCVAR = NUMBER OF ITERATIVE VARIABLES                     00046000*   2
              4. HIER = NUMBER OF LEVELS OF HIERARCHY                      00047000*   2
              5. DESIGN = NUMBER OF DESIGN VARIABLES                       00048000*   2
CARD 3-N:  FORMAT 10I5, ITERATIVE VARIABLES (IF ANY) WILL BE READ          00049000*   2
              COL 1-5: HIERARCHY LEVEL                                     00050000*   2
              COL 6-10: NUMBER OF ITERATIVE VARIABLES IN HIERARCHY         00051000*   2
```

```
                        COL 11 = 13: NUMBER OF ITERATIVE VARIABLES TO BE       *  00052000*   2   0
                                     CLOSED ON IN THIS ITERATIVE LOOP -        *  00053000*   2   0
                                     THE DIFFERENCE BETWEEN THIS NUMBER AND THE*  00054000*   2   0
                                     NUMBER OF ITERATIVE VARIABLES IN THIS     *  00055000*   2   0
                                     HIERARCHY LEVEL WILL BE CARRIED ON        *  00056000*   2   0
                        COL 16 - 80: ITERATIVE VARIABLES NUMBERS               *  00057000*   2   0
      CARD N = M:       DESIGN VARIABLE NUMBERS (THESE SHOULD BE IN ASCENDING  *  00058000*   2   0
                        NUMERICAL ORDER FOR EFFICIENCY) CARD FORMAT IS 1615    *  00059000*   2   0
      FILE IN           CARD(2,10);                                            *  00060000*   2   3
      FILE OUT          LINE 4 (2,15);                                         *  00061000*   2   7
      FORMAT            F1(1615);                                              *  00062000*   2
                        F8U(BU1);                                              *  00063000*   2
                        F8(13A6,X2);                                           *  00064000*   2         FMT SIZE  13 WDS

INTEGER           I,E,BBJ,KCVAR,HIER,DESIGN,        J,K,S,H,DUM,M;       *  00065000*   2         7
      INTEGER           NUNIT, NSTREAM, NCOMP, LPCNT, VARSOL, Q, R, SS;        *  00066000*   2         7
      INTEGER           V, VVJ                                                 *  00067000*   2         7
      BOOLEAN           RSRC, ELM, IMPLICIT, FIRSTPASS;                        *  00068000*   2         7
      ARRAY             ALP,CK(U:14);                                          *  00069000*   2         7
      COMMENT           READ HEADER AND DIMENSIONING CARD;                     *  00070000*   2         7
                        READ(CARD,F6, FOR I + 1 STEP 1 UNTIL 13 DO ALP[I]);    *  00071000*   2         7
                        READ(CARD,F1,E,BBJ,KCVAR,HIER,DESIGN);                 *  00072000*   2        20
      COMMENT           * * * * * * * * * * * * * * * * * * * * * * * * * *  *;  00073000*   2        33
                                   BLOCK 1 STARTS HERE                           00074000*   2        33
                        * * * * * * * * * * * * * * * * * * * * * * * * * *  *;  00075000*   2        33
      INTEGER ARRAY     BIGBOOLIOSE,O:BBJ), KCLO:HIER,O:KCVAR+1), DELO:DESIGN);*  00076000*   2        33
                        DIRCTRY,PRECICE;, CULFREL(0:BBJ),                         00077000*   2        33
                        VAR,IO(0:BBJ),                            KC(0:KCVAR), *  00078000*   4        13STMT
                                                                LOOPLO:HIER);  *  00079000*   4        21
                        RECSAVE(O:KCVAR+1,O:E), SEQ,SVAR(O:E);                 *  00080000*   4        20
      BOOLEAN ARRAY     COLLLIML(O:BBJ), ROMELIML(O:E), RECUSE(U:O:BBJ),       *  00081000*   4        29
      BOOLEAN ARRAY     EXPLICIT(O:BBJ);                                       *  00082000*   4        33
      LABEL             FINS,L1,L2,L3,L11,L4,L5,L12;                           *  00083000*   4        42
      FORMAT            UDC(X10,"PROBLEM IDENTIFICATION ",13A6);               *  00084000*   4        53
                        UVAR(X10,"DESIGN VARIABLES CHOSEN IN THIS PROBLEM ARE",*  00085000*   4        50
                        //);                                                   *  00086000*   4        50
                        UVARNU(X20,15);                                        *  00087000*   4
                        RHVAR(X10,"ITERATIVE VARIABLES (AND THEIR ASSOCIATED ",*  00088000*   4
                        "HIERARCHY LEVEL) CHOSEN IN THIS PROBLEM ARE: ",//);   *  00089000*   4
                        KVARNU(X20,15);                                        *  00090000*   4
                        RHVARNU(X10,15,X5,15);                                 *  00091000*   4
                                                                               *  00092000*   4
      PROCEDURE         WRITEOUTPUT;                                           *  00093000*             FMT SIZE  61 WDS
      BEGIN                                                                       00094000*   4        50
                        WRITE(LINE[PAGE]);                                     *  00095000*   4        50
                        WRITE(LINE,</"C A L C U L A T I O N A L    S E Q U E N",*  00096000*   4        50
                        " C E"//));                                            *  00097000*   4        62
                                                                               *  00098000*   6        63
                        WRITE(LINE,<X2,"SEQUENCE NO.",X4,"VARIABLE",X4,"EQUATION",*00099000*   4        FMT SIZE  14 WDS
                        "N",X4,"LOOP TO SEQUENCE NO."/>);                      *  00100000*   7        65
                                                                                                       60
```

```
                FOR I + 1 STEP 1 UNTIL 5 DO
                WRITE(LINE,<X2,I5,X11,I5,X7,I5,X7,I5>, 1, SVAR[I]).              0010100U*     FMT SIZE  19 NDS
                                                                                0010200U*      4          88
                SEQ[1], DIRCTRY[1]));                                                                      69
        END;                                                                    0010300U*     FMT SIZE  11 NDS
IN THE ABOVE PROCEDURE, THE FOLLOWING GLOBAL VARIABLES ARE USED:                0010400U*      4          75
                                                                                               4          83
I   SVAR    SEQ     DIRCT.
        COMMENT    END OF PROCEDURE DECLARATIONS                                0010500U*                 83
                   READ ITERATIVE VARIABLES THEN DESIGN VARIABLES;               0010600U*     4          83
                   IF NCVAR > 0 THEN                                            0010700U*     4          83
                   FOR I + 1 STEP 1 UNTIL HIER DO                               0010800U*     4          84
                   BEGIN                                                        0010900U*     4          88
                   READ(CARD,10,CK[*]);                                         0011000U*     4          88
                   READ(CK[*],<X5,I5I5>,J,FOR K + 1 STEP 1 UNTIL J+1 DO         0011100U*     4          90
                        KC[I,K]);                   KC[I,0] + J;
        END;                                                                                  FMT SIZE   5 NDS
                   IF DESIGN > 0 THEN                                           0011200U*     4         101
                   READ(CARD,F1,FOR I + 1 STEP 1 UNTIL DESIGN DO DEL[I]);       0011300U*     4         107
                   READ IN THE SYSTEM STRUCTURAL MATRIX;                        0011400U*     4         112
        COMMENT                                                                 0011500U*     4         112
                   FOR I + 1 STEP 1 UNTIL E DO                                  0011600U*     4         125
                   READ(CARD, F80, FOR J + 1 STEP 1 UNTIL BBJ DO                0011700U*     4         125
                        BIGBOOL[I,J]);                                          0011800U*     4         127
                   WRITE(LINE,00, FOR I + 1 STEP 1 UNTIL 13 DO ALF[I]);         0011900U*     4         132
                   WRITE(LINE[DBL]);                                            0012000U*     4         142
                   WRITE(LINE,DVAR);                                            0012100U*     4         153
                   FOR I + 1 STEP 1 UNTIL DESIGN DO                             0012200U*     4         157
                   WRITE(LINE,DVARND, DEL[I]);                                  0012300U*     4         160
                   IF NCVAR > 0 THEN                                            0012400U*     4         161
                   BEGIN                                                        0012500U*     4         171
                   WRITE(LINE[DBL]);                                            0012600U*     4         172
                   WRITE(LINE,RHVAR);                                           0012700U*     4         172
                   IF HIER = 1 THEN                                             0012800U*     4         176
                   BEGIN                                                        0012900U*     4         179
                   FOR I + 1 STEP 1 UNTIL RCVAR DO                              0013000U*     4         180
                   WRITE(LINE,RVARND, KC[I,]);                                  0013100U*     4         181
                   END ELSE                                                     0013200U*     4         182
                   FOR I + 1 STEP 1 UNTIL HIER DO                               0013300U*     4         192
                   FOR J + 2 STEP 1 UNTIL KC[I,0]+1 DO                          0013400U*     4         192
                   IF J=2 THEN                                                  0013500U*     4         194
                   BEGIN                                                        0013600U*     4         199
                   WRITE(LINE,RHVARND, 1, KC[I,J]);                             0013700U*     4         200
                   END ELSE                                                     0013800U*     4         200
                   WRITE(LINE,RVARND, KC[I,J]);                                 0013900U*     4         211
        END;                                                                    0014000U*     4         211
        COMMENT    INITIALIZE CONDITIONS AND SET DESIGN COLUMNS TO ZERO;        0014100U*     4         223
                   KSKC + FALSE;        IMPLICIT + FALSE;                       0014200U*     4         223
                   S + OJ M + OJ LPCNT + OJ KC[0,0] + OJ DUM + OJ               0014300U*     4         223
                   FOR I + 1 STEP 1 UNTIL E DO                                  0014400U*     4         224
                                                                                0014500U*     4         229
```

```
         BEGIN                                                              *  00146000*    4   243
             FOR J + 1 STEP 1 UNTIL BBJ DO                                  *  00147000*    4   244
             BEGIN                                                          *  00148000*    4   252
                 FRE[IJ] + FRE[IJ] + BIGBOOL[I,JJ];                         *  00149000*    4   252
                 COLFRE[J] + COLFRE[J] + BIGBOOL[I,J];                      *  00150000*    4   235
             END;                                                           *  00151000*    4   236
             IF FRE[IJ] = 0 THEN NUMELIM[I] + TRUE;                         *  00152000*    4   240
         END;                                                               *  00153000*    4   243
             FOR J + 1 STEP 1 UNTIL BBJ DO                                  *  00154000*    4   245
             IF COLFRE[J] = 0 THEN COLELIM[J] + TRUE;                       *  00155000*    4   246
             FOR I + 1 STEP 1 UNTIL DESIGN DO                               *  00156000*    4   251
             COLELIMIDE[I] + TRUE;                                          *  00157000*    4   252
COMMENT  ZERO EQUATION AND VARIABLE FREQUENCY;                              *  00158000*    4   255
             FOR I + 1 STEP 1 UNTIL E DO                                    *  00159000*    4   257
             FRE[IJ] + 0;                                                   *  00160000*    4   260
             FOR J + 1 STEP 1 UNTIL BBJ DO                                  *  00161000*    4   260
             COLFRE[J] + 0;                                                 *  00162000*    4   262
COMMENT  START DETERMINING CALCULATIONAL SEQUENCE BY ELIMINATING            *  00163000*    4   263
         EQUATIONS WITH FREQUENCY EQUAL TO ONE AND THE CURRES=              *  00164000*    4   265
             PONDING VARIABLE ALSO CHECK HERE IF FINISHED;                  *  00165000*    4   265
L1:          FIRSTPASS + FALSE;                                             *  00166000*    4   265
L12:         FOR K + 1 STEP 1 UNTIL BBJ DO                                  *  00167000*    4   266
         BEGIN                                                              *  00168000*    4   268
             IF NOT COLELIM[K] THEN GO TO L11;                              *  00169000*    4   268
         END;                                                               *  00170000*    4   269
             GO TO FINI;                                                    *  00171000*    4   271
L11:         FOR J + 1 STEP 1 UNTIL BBJ DO COLFRE[J] + 0;                   *  00172000*    4   271
             FOR I + 1 STEP 1 UNTIL E DO                                    *  00173000*    4   276
         BEGIN                                                              *  00174000*    4   278
             FRE[IJ] + 0;                                                   *  00175000*    4   278
             IF NOT NUMELIM[I] THEN                                         *  00176000*    4   279
         BEGIN                                                              *  00177000*    4   280
             FOR J + 1 STEP 1 UNTIL BBJ DO                                  *  00178000*    4   280
             IF NOT COLELIM[J] THEN                                         *  00179000*    4   280
             IF BIGBOOL[I,J] = 1 THEN                                       *  00180000*    4   282
         BEGIN                                                              *  00181000*    4   285
             COLFRE[J] + COLFRE[J] + 1;                                     *  00182000*    4   285
             FRE[IJ,15:16] + J;                                             *  00183000*    4   287
             FRE[IJ] + FRE[IJ] + 1;                                         *  00184000*    4   290
         END;                                                               *  00185000*    4   292
         END;                                                               *  00186000*    4   294
         BEGIN                                                              *  00187000*    4   296
             FOR J + 1 STEP 1 UNTIL BBJ DO                                  *  00188000*    4   296
             IF NOT COLELIM[J] THEN                                         *  00189000*    4   298
             IF COLFRE[J] = 0 THEN                                          *  00190000*    4   298
         BEGIN                                                              *  00191000*    4   300
             DUM + S - 1;                                                   *  00192000*    4   300
             IMPLICIT + TRUE;                                               *  00193000*    4   302
             COLELIM[J] + TRUE;                                             *  00194000*    4   302
         END;                                                               *  00195000*    4   304
             ELM + FALSE;                                                   *  00196000*    4   306
             FOR I + 1 STEP 1 UNTIL E DO                                    *  00197000*    4   307
```

```
              IF FRE[I].[3:8:7]/= 1 THEN                                  00198000*    4    308
              IF NOT COLELIM[FRE[I].[15:16]] OR COLELIM[FRE[I].[15:16]]*  00199000*    4    309
              AND EXPLICIT[FRE[I].[15:16]] AND NOT NUMELIM[I] THEN        00200000*    4    311
              BEGIN                                                       00201000*    4    315
                NUMELIM[I] <- TRUE;                                       00202000*    4    316
                COLELIM[FRE[I].[15:16]] <- TRUE;                          00203000*    4    317
                S <- S + 1;                                               00204000*    4    319
                SVAR[S] <- FRE[I].[15:16];                                00205000*    4    320
                SEW[S] <- 1;                                              00206000*    4    322
                ELM <- TRUE;                                              00208000*    4    323
                FOR N <- 2 STEP 1 UNTIL RC[H,0]+1 DO                      00209000*    4    324
                IF SVAR[S] = RC[H,N] THEN                                 00209000*    4    330
                BEGIN                                                     00210000*    4    332
                  RECUSED[RC[H,N]] <- TRUE;                               00211000*    4    332
                  SVAR[S] <- -FRE[I].[15:16];                             00212000*    4    334
                  DIRCTRY[S] <- LOOP[H];                                  00213000*    4    337
                END;                                                      00214000*    4    338
                SS <- 0;                                                  00215000*    4    339
                IF IMPLICIT THEN                                          00216000*    4    339
                BEGIN                                                     00217000*    4    340
                  FOR W <- 1 STEP 1 UNTIL H DO                            00218000*    4    340
                  SS <- FRE[I].[15:16];                                   00219000*    4    342
                  IF EXPLICIT[SS] THEN                                    00220000*    4    342
                BEGIN                                                     00221000*    4    343
                  IF H >= 1 THEN                                          00222000*    4    343
                BEGIN                                                     00223000*    4    344
                  FOR N <- 1 STEP 1 UNTIL H DO                            00224000*    4    345
                  FOR M <- 2 STEP 1 UNTIL RC[H,0]+1 DO                    00225000*    4    350
                    RECUSED[W,M] <- TRUE;                                 00226000*    4    355
                END;                                                      00227000*    4    355
                  SVAR[S] <- -SS;                                         00228000*    4    357
                  DIRCTRY[S] <- -DUM;                                     00229000*    4    358
                END;                                                      00230000*    4    358
                END;                                                      00231000*    4    358
                EXPLICIT[FRE[I].[15:16]] <- TRUE;                         00232000*    4    360
                VARSUL <- 0;                                              00233000*    4    362
                IF ELM THEN GO TO L12 ELSE                                00234000*    4    363
                IF H >= 1 THEN                                            00235000*    4    363
              BEGIN                                                       00236000*    4    365
                FOR N <- 2 STEP 1 UNTIL RC[H,0]+1 DO                      00237000*    4    365
                IF RECUSED[RC[H,M]] THEN VARSUL <- VARSUL + 1;            00238000*    4    371
                IF VARSUL < RC[H,1] THEN                                  00239000*    4    375
              BEGIN                                                       00240000*    4    376
                H <- H -1;        RSRC <- TRUE;                           00241000*    4    377
              END;                                                        00242000*    4    379
              END;                                                        00243000*    4    379
                IF H >= 1 THEN                                            00244000*    4    379
                IF VARSUL = RC[H,1] THEN                                  00245000*    4    380
                FOR W <- 2 STEP 1 UNTIL RC[H,0]+1 DO                      00246000*    4    382
                IF NOT RECUSED[RC[H,W]] THEN                              00247000*    4    388
                FOR N <- 2 STEP 1 UNTIL RC[H+1,0]+1 DO                    00248000*    4    390
```

```
            BEGIN                                                      * 00249000*    4     390
              IF RC[H+1,K] ≤ 0 THEN                                    * 00250000*    4     390
              BEGIN                                                    * 00251000*    4     398
                RC[H+1,K] ← RC[H,Q];                                   * 00252000*    4     399
                RC[H,J] ← 0;                                           * 00253000*    4     402
                WRITE(LINE,<"NEW ASSIGNMENT OF THE ITERATIVE ",        * 00254000*    4     404
                "VARIABLE(S) IS", I10>, RC[H+1,K]);                    * 00255000*   10     406
                                                                                    FMT SIZE  13  MDS
              END;                                                     * 00256000*    4     414
            END;                                                       * 00257000*    4     415
                          GO TO L2;                                    * 00258000*    4     415
  COMMENT     SET BIGBOOL LOCATIONS CORRESPONDING TO THE ITERATIVE     * 00259000*    4     415
              VARIABLES IN THE HIERARCHY UNDER STUDY TEMPORARILY TO    * 00260000*    4     415
              ZERO AND KEEP ACCOUNTING RECORDS IN RECSAVE ARRAY;       * 00261000*    4     415
  L2:         H ← H + 1;       IF H > HIER THEN GO TO FIN;             * 00262000*    4     415
              LPCNT ← LPCNT + 1;   IF LPCNT ≥ 50 THEN GO TO FIN;       * 00263000*    4     418
              IF NOT MSHC THEN LOOP[H] ← S+1;   BSHC ← FALSE;          * 00264000*    4     421
              FOR I ← 1 STEP 1 UNTIL E DO                              * 00265000*    4     424
              IF NOT RUMELIM[I] THEN                                   * 00266000*    4     426
              FOR J ← 2 STEP 1 UNTIL RC[H,0]+1 DO                      * 00267000*    4     426
              IF NOT COLELIM[RC[H,J]] THEN                             * 00268000*    4     432
              IF BIGBOOL[I,RC[H,J]] = 1 THEN                           * 00269000*    4     434
            BEGIN                                                      * 00270000*    4     437
              BIGBOOL[I,RC[H,J]] ← 0;                                  * 00271000*    4     438
              RECSAVE[J,I] ← 1;                                        * 00272000*    4     441
            END;                                                       * 00274000*    4     443
              K ← 0;      VV ← 0;         SS ← 0;                      * 00275000*    4     446
  L3:         FOR I ← 1 STEP 1 UNTIL E DO FREL[I] ← 0;                 * 00276000*    4     448
              FOR J ← 1 STEP 1 UNTIL BBJ DO COLFREL[J] ← 0;            * 00277000*    4     453
              FOR I ← 1 STEP 1 UNTIL E DO                              * 00278000*    4     458
              IF NOT RUMELIM[I] THEN                                   * 00279000*    4     460
            BEGIN                                                      * 00280000*    4     460
              FOR J ← 1 STEP 1 UNTIL RBJ DO                            * 00281000*    4     461
              IF NOT COLELIM[J] THEN                                   * 00282000*    4     462
              IF BIGBOOL[I,J] = 1 THEN                                 * 00283000*    4     462
            BEGIN                                                      * 00284000*    4     465
              COLFREL[J] ← COLFREL[J] + 1;                             * 00285000*    4     465
              FREL[I].[15:10] ← J;                                     * 00286000*    4     467
              FREL[I] ← FREL[I] + 1;                                   * 00287000*    4     470
            END;                                                       * 00288000*    4     472
              LPCNT ← LPCNT + 1;       IF LPCNT ≥ 25 THEN GO TO FIN;   * 00289000*    4     474
  L4:         FOR J ← 1 STEP 1 UNTIL E DO                              * 00290000*    4     476
            BEGIN                                                      * 00291000*    4     479
              FOR I ← 2 STEP 1 UNTIL RC[H,0]+1 DO                      * 00292000*    4     480
              IF RECSAVE[I,J] = 1 AND NOT RECUSED[RC[H,0],I] DO        * 00293000*    4     480
            BEGIN                                                      * 00294000*    4     489
              IF FREL[J].[3:1:1] = 0 AND NOT RUMELIM[J] THEN           * 00295000*    4     489
            BEGIN                                                      * 00296000*    4     489
              RUMELIM[J] ← TRUE;                                       * 00297000*    4     492
              COLELIM[RC[H,J]] ← TRUE;         EXPLICIT[RC[H,J] ← TRUE;* 00298000*    4     492
              S ← S + 1;      K ← K + 1;                               * 00299000*    4     494
                                                                       * 00300000*    4     498
```

```
              SVAR[S] +=RC[H,I]J                              *  00301000*    4   501
              DIRCTRY[S] + LOUP[H]J                           *  00302000*    4   503
                                                              *
              SEQ[S] + JJ                                     *  00303000*    4   505
              RECUSEDIRC[H,I]J + TRUEJ  IF K = RC[H,0] THEN GO TO L5J  * 00304000* 4  506
           END ELSE                                           *  00305000*    4   510
              IF FRE[JJ.[3[1/] = 1 AND COLFRE[FRE[J].[1S[16]] > 1 THEN*  00306000* 4  510
           BEGIN                                              *  00307000*    4   514
              IF NOT MORELIM[J]J THEN                         *  00308000*    4   515
              IF NOT COLELIM[FRE[J].[1S[16]] THEN             *  00309000*    4   516
           BEGIN                                              *  00310000*    4   518
              MORELIM[J]J + TRUEJ                             *  00311000*    4   518
              COLELIM[FRE[J].[1S[16]] + TRUEJ                 *  00312000*    4   519
              S + S + 1J                    SS + SS + 1J      *  00313000*    4   521
              SVAR[S] + FRE[JJ.[1S[16]J                       *  00314000*    4   524
              SEQ[S] + JJ           EXPLICIT[FRE[J].[1S[16]] + TRUEJ  *  00315000*  4  526
              K + K + 1J                                      *  00316000*    4   529
              FOR M + 2 STEP 1 UNTIL RC[H,0]+1 DO             *  00317000*    4   530
              IF SVAR[S] = RC[H,M] THEN                       *  00318000*    4   536
           BEGIN                                              *  00319000*    4   538
              RECUSEDIRC[H,M]J + TRUEJ                        *  00320000*    4   538
              SVAR[S] +=FRE[J].[1S[16]J                       *  00321000*    4   541
              DIRCTRY[S] + LOOP[H]J                           *  00322000*    4   543
                                                              *  00323000*    4   544
           ENDJ                                               *  00324000*    4   545
           ENDJ                                               *  00325000*    4   545
           ENDJ                                               *  00326000*    4   545
              IF NOT FIRSTPASS THEN                           *  00327000*    4   548
              IF K = RC[H,0] THEN GO TO L5J                   *  00328000*    4   549
                                                              *  00329000*    4
              IF NOT FIRSTPASS THEN                           *  00330000*    4   551
              IF K < RC[H,0] THEN GO TO L3 ELSE GO TO L5J     *  00331000*    4   551
              RESET ITERATIVE VARIABLE LOCATIONSJ             *  00332000*    4   555
              FIRSTPASS + TRUEJ                               *  00333000*    4   555
              FOR J + 1 STEP 1 UNTIL E DO                     *  00334000*    4   555
              FOR I + 2 STEP 1 UNTIL RC[H,0]+1 DO             *  00335000*    4   557
              IF RECSAVE[I,J] = 1 THEN                        *  00336000*    4   562
           BEGIN                                              *  00337000*    4   564
              RECSAVE[I,J] + 0J                               *  00338000*    4   564
              BIGBOOL[J,RC[H,I]] + 1J                         *  00339000*    4   566
           ENDJ                                               *  00340000*    4   569
              FOR I + 2 STEP 1 UNTIL RC[H,0]+1 DO             *  00341000*    4   572
           BEGIN                                              *  00342000*    4   578
              IF NOT RECUSEDIRC[H,I]J THEN          GO TO L11J*  00343000*    4   578
           ENDJ                                               *  00344000*    4   580
              GO TO L1J                                       *  00345000*    4   580
              WRITEOUTPUTJ                                    *  00346000*    4   581
                                                              *  00347000*    4   581
   FINIS  ENDJ                                                *                   SEG SIZE  585 WDS
                                                                                          2    35
                                                                                  SEG SIZE  3M WDS
          END.                                                *  00348000*    4
```

What is claimed is:

1. In a process for the analysis or design of a physical system, which system is represented by algebraic equations, some or all of which may be non-linear, with a minimum of iterative calculation, by solving said equations in the order selected by a computational sequence and thereby determining numerical values for variables in said algebraic equations, the improvement comprising in combination determining said computational sequence by use of a programmed computing system having stored in its internal memory a program enabling the computing machine to perform in combination the steps of:
   a. forming a single system structural matrix in which each row is an equation of said system and each column is a variable of said system, or vice-versa, and wherein each variable is designated in each equation as being either known or unknown,
   b. identifying design and/or iterative variables by algebraic operations on the system structural matrix so as to minimize the number of said iterative variables, and identifying iterative variable hierarchy levels, when present so as to minimize nested iterative calculations,
   c. selecting the computational sequence for solution of said equations, said sequence being selected by algebraic manipulation of the system structural matrix.

2. The process of claim 1 wherein the algebraic operations which minimize the number of iterative variables comprise in combination:
   a. computing the frequency of occurrence of each variable in the system structural matrix,
   b. eliminating variables with zero frequency of occurrence from the system structural matrix, said zero frequency variables being already known, the number of variables in said system structural matrix being thereby reduced,
   c. computing the number of unknown variables remaining in each equation,
   d. if unknown variables still remain, recomputing the frequency of occurrence of each variable,
   e. determining the minimum frequency of occurrence of unknown variables and then redesignating as known, equations which contain the minimum frequency variables until the number of equations redesignated as known equals the minimum frequency of occurrence minus one,
   f. recomputing the frequency of occurrence of each unknown variable and indicating that minimum frequency minus one iterative variables have been identified as being within the remaining unknown variables, indicating that a hierarchy level has been detected,
   g. redesignating as known any unknown variable which appears in only one equation after step d. and also redesignating the equation as known, provided that said equation has not been previously designated as known,
   h. designating as "design or iterative variables" each unknown variable which appears in only one equation after step d. said equation have been redesignated as known in accordance with step g. above, said "design or iterative" variables associated with any hierarchy level designated by a number less than or equal to the number designating the present hierarchy level.

3. The process of claim 1 wherein the algebraic manipulations for selecting the computational sequence for solution of said equations so as to minimize nested iterative calculations comprises in combination the steps of:
   a. selecting a set of design variables and designating them as known,
   b. determining the frequency of occurrence of unknown variables and, also, computing the number of unknown variables in each equation of the system structural matrix,
   c. redesignating as known those variables which appear by themselves in an equation and redesignating as known that equation; but if it is determined that the minimum number of unknown variables remaining in each equation is greater than one, then,
   d. proceeding by temporarily designating as known all iterative variables appearing in the hierarchy level under consideration,
   e. redesignating as known, an unknown variable with a frequency of occurrence greater than one and simultaneously redesignating as known an equation in which the only unknown variable is that unknown variable which equation also contains at least one iterative variable,
   f. checking to see if the number of unknown variables in each equation of the system structural matrix is equal to zero and if the number is equal to zero solving for one iterative variable in terms of the other(s),
   g. checking to see if the number of equations redesignated as known is equal to the number of essential iterative variables in the hierarchy level under consideration, and if the number is less than the number of essential iterative variables, proceeding in accordance with step d., above,
   h. redesignating as unknown those iterative variables within the iterative variable hierarchy under study, which have not been redesignated as known in accordance with step d. above,
   i. if all system variables have been redesignated as known, designating as the calculational sequence, the order is which the system variable and the corresponding equation have been redesignated as known,
   j. if unknown variables still remain, recomputing the frequency of occurrence of each variable and by computing the number of unknown variables remaining in each equation and proceeding in accordance with step c. above.

4. The process of claim 2 wherein the algebraic manipulations for selecting the computational sequence for solution of said equations comprises in combination the steps of;
   a. selecting a set of design variables and designating them as known,
   b. determining the frequency of occurrence of unknown variables and, also, computing the number of unknown variables in each equation of the system structural matrix,
   c. redesignating as known those variables which appear by themselves in an equation and redesignating as known that equation; but if it is determined that the number of unknown variables remaining in each equation is greater than one, then,
d. proceeding by temporarily designating as known all iterative variables appearing in the hierarchy level under consideration,
e. redesignating as known an unknown variable with a frequency of occurrence greater than one and simultaneously redesignating as known an equation in which the only unknown variable is that unknown variable which equation also contains at least one iterative variable,
f. checking to see if the number of unknown variables in each equation of the system structural matrix is equal to zero and if the number is equal to zero solving for one iterative variable in terms of the other(s),
g. checking to see if the number of equations redesignated as known is equal to the number of essential iterative variables in the hierarchy level under consideration, and if the number is less than the number of essential iterative variables, proceeding in accordance with step d., above,
h. redesignating as unknown those iterative variables within the hierarchy under study, which have not been redesignated as known in accordance with step d. above,
i. if all systems have been redesignated as known, designating as the calculational sequence, the order in which the system variable and the corresponding equation have been redesignated as known,
j. if unknown variables still remain, recomputing the frequency of occurrence of each variable and by computing the number of unknown variables remaining in each equation and proceeding in accordance with step c. above.

5. The process of claim 1 wherein the algebraic operations which minimize the number of iterative variables comprise in combination:
a. computing the frequency of occurrence of each variable in the system structural matrix,
b. eliminating variables with zero frequency of occurrence from the system structural matrix, said zero frequency variables being already known, the number of variables in said system structural matrix being thereby reduced,
c. computing the number of unknown variables remaining in each equation,
d. if unknown variables still remain, recomputing the frequency of occurrence of each variable,
e. determining the minimum frequency of occurrence of unknown variables and then redesignating as known, equations which contain the minimum frequency variables until the number of equations redesignated as known equals the minimum frequency of occurrence minus one,
f. recomputing the frequency of occurrence of each unknown variable and indicating that minimum frequency minus one iterative variables have been identified as being within the remaining unknown variables, indicating that a hierarchy level has been detected,
g. redesignating as known any unknown variable which appears in only one equation after step d. and also redesignating the equation as known, provided that said equation has not been previously designated as known,
h. designating as "design or iterative variables" each unknown variable whose variable frequency becomes zero after step d. and whose equations have been redesignated as known in accordance with step g. above, said "design or iterative" variables associated with any hierarchy level designated by a number less than or equal to the number designating the present hierarchy level.

6. A process according to claim 1 wherein said structural matrix is descriptive of a system in the cost analysis art.

7. A process according to claim 1 wherein said structural matrix is descriptive of a system in the plant design art.

8. A process according to claim 1 wherein said structural matrix is descriptive of a system in the electronics art.

9. A process according to claim 1 wherein said structural matrix is descriptive of a system in the distribution analysis art.

* * * * *

UNITED STATES PATENT OFFICE
CERTIFICATE OF CORRECTION

Patent No. 3,702,003                    Dated Oct. 31, 1973

Inventor(s) W. Fred Ramirez, Jr. and Charles R. Vestal

It is certified that error appears in the above-identified patent and that said Letters Patent are hereby corrected as shown below:

Col. 7, line 23:       "been found (III)" should read --been found (XIII)--

Col. 14, line 44:      "Variable Frequency $x_1$" should read
                       --Variable Frequency $\frac{x_1 \ x_2}{0 \ \ 0}$    --

Col. 21, line 19:      "$8x_1$ ] $[x_2]ix_3$" should read --$[x_1]$ $[x_2]x_3$--

Col. 28, Table V-1:    Variable Column should read --f-- at lines 29-35

Col. 29, Table V-4:
   Seq. 3:             "Var. 2, $x_{1,3}$ eqn 6," should read --Var. 2, $x_{1,3}$
                       Eqn. 5, --

Seq. 5:             "Var. 8, $F_5$" should read --Var. 13, $F_5$--

Seq. 16:            "Var. 6, $T_6$" should read --Var. 25, $T_6$--

Col. 35, Table VII-2
   Line 3:             "$H_D = f(Y_D, Y_D, T_C)$" should read --$H_D = f(Y_D, Y'_D, T_C)$--

Signed and sealed this 29th day of May 1973.

(SEAL)
Attest:

EDWARD M. FLETCHER, JR.                    ROBERT GOTTSCHALK
Attesting Officer                          Commissioner of Patents